US012601995B2

(12) United States Patent
Fujiwara et al.

(10) Patent No.: US 12,601,995 B2
(45) Date of Patent: Apr. 14, 2026

(54) FRAME DEVICE INCLUDING SEPARATE SUPPORT FRAMES AND IMAGE FORMING APPARATUS

(71) Applicants: Hitoshi Fujiwara, Tokyo (JP); Yutaka Ikebuchi, Kanagawa (JP); Shigeo Nanno, Kyoto (JP); Hiromasa Takagi, Tokyo (JP); Yuusuke Furuichi, Kanagawa (JP)

(72) Inventors: Hitoshi Fujiwara, Tokyo (JP); Yutaka Ikebuchi, Kanagawa (JP); Shigeo Nanno, Kyoto (JP); Hiromasa Takagi, Tokyo (JP); Yuusuke Furuichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/443,333

(22) Filed: Feb. 16, 2024

(65) Prior Publication Data

US 2024/0295842 A1 Sep. 5, 2024

(30) Foreign Application Priority Data

Mar. 3, 2023 (JP) ................................. 2023-032711

(51) Int. Cl.
*G03G 15/20* (2006.01)

(52) U.S. Cl.
CPC ..... *G03G 15/2017* (2013.01); *G03G 15/2057* (2013.01); *G03G 15/206* (2013.01); *G03G 15/2064* (2013.01)

(58) Field of Classification Search
None
See application file for complete search history.

(56) References Cited

U.S. PATENT DOCUMENTS 12,050,422 B2 * 7/2024 Uehara .............. G03G 21/1647
2021/0278790 A1 9/2021 Furuichi et al.

FOREIGN PATENT DOCUMENTS

JP 2017-191247 A 10/2017
JP 2020-052345 A 4/2020

* cited by examiner

*Primary Examiner* — Arlene Heredia Ocasio
(74) *Attorney, Agent, or Firm* — XSENSUS LLP

(57) ABSTRACT

A frame device includes a body frame and a rotator that rotates in a rotation direction. A first support frame supports one lateral end of the rotator in a longitudinal direction of the rotator. The first support frame includes a first attachment portion that is attached to the body frame. A second support frame supports another lateral end of the rotator in the longitudinal direction of the rotator. The second support frame includes a second attachment portion that is attached to the body frame.

13 Claims, 19 Drawing Sheets

FRAME DEVICE INCLUDING SEPARATE SUPPORT FRAMES AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-032711, filed on Mar. 3, 2023, in the Japan Patent Office, the entire disclosure of which is hereby incorporated by reference herein.

BACKGROUND

Technical Field

Embodiments of this disclosure relate to a frame device and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses are installed with a heating device. As one example, the heating device is a fixing device that heats a recording medium such as a sheet to fix an unfixed image on the recording medium.

The fixing device includes a pair of rotators, a heater, and a pair of support frames. The rotators contact each other to form a nip therebetween. The heater heats at least one of the rotators. The support frames are disposed opposite both lateral ends of each of the rotators, respectively, in a longitudinal direction thereof and rotatably support the rotators. As a sheet bearing an unfixed image enters the nip formed between the rotators that rotate, the rotators fix the unfixed image on the sheet under heat and pressure.

SUMMARY

This specification describes below an improved frame device. In one embodiment, the frame device includes a body frame and a rotator that rotates in a rotation direction. A first support frame supports one lateral end of the rotator in a longitudinal direction of the rotator. The first support frame includes a first attachment portion that is attached to the body frame. A second support frame supports another lateral end of the rotator in the longitudinal direction of the rotator. The second support frame includes a second attachment portion that is attached to the body frame.

This specification further describes an improved image forming apparatus. In one embodiment, the image forming apparatus includes a body frame and a first rotator that rotates in a rotation direction. A second rotator contacts the first rotator to form a nip between the first rotator and the second rotator. A heater heats at least one of the first rotator or the second rotator. A first support frame supports one lateral end of the first rotator and the second rotator in a longitudinal direction of the first rotator and the second rotator. The first support frame includes a first attachment portion that is attached to the body frame. A second support frame supports another lateral end of the first rotator and the second rotator in the longitudinal direction of the first rotator and the second rotator. The second support frame includes a second attachment portion that is attached to the body frame.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
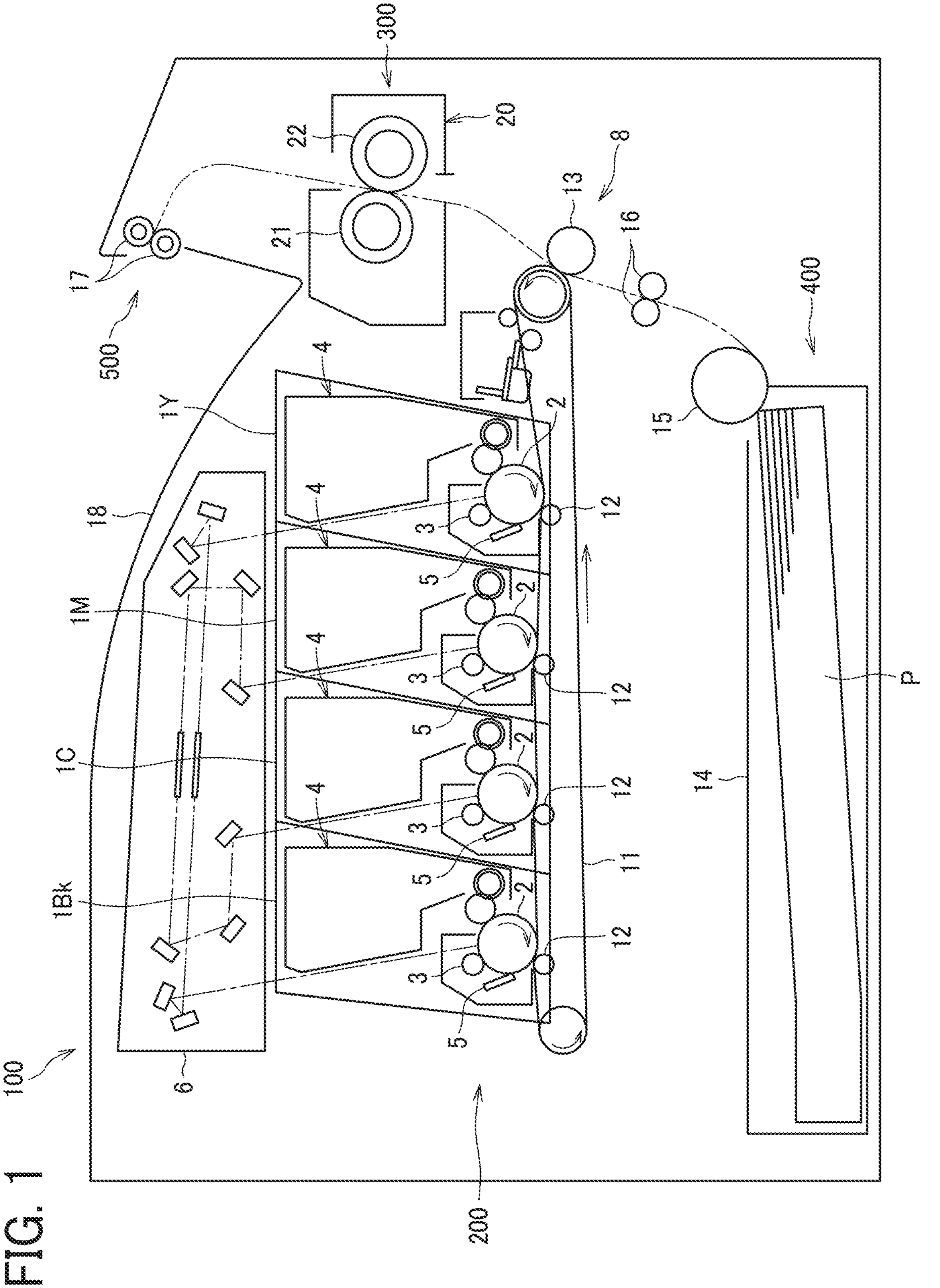
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

FIG. 1 is a schematic cross-sectional view of an image forming apparatus 100 according to an embodiment of the present disclosure. The image forming apparatus 100 is a printer. Alternatively, the image forming apparatus 100 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of an overall construction and operation of the image forming apparatus 100 according to an embodiment of the present disclosure.

As illustrated in FIG. 1, the image forming apparatus 100 according to the embodiment includes an image forming portion 200, a fixing portion 300, a recording medium supply portion 400, and a recording medium ejecting portion 500. The image forming portion 200 forms a toner image on a sheet P serving as a recording medium. The fixing portion 300 fixes the toner image on the sheet P. The recording medium supply portion 400 supplies the sheet P to the image forming portion 200. The recording medium ejecting portion 500 ejects the sheet P onto an outside of the image forming apparatus 100.

The image forming portion 200 includes four process units 1Y, 1M, 1C, and 1Bk, an exposure device 6, and a transfer device 8. The process units 1Y, 1M, 1C, and 1Bk serve as image forming units or image forming devices, respectively. The exposure device 6 forms an electrostatic latent image on a photoconductor 2 of each of the process units 1Y, 1M, 1C, and 1Bk. The transfer device 8 transfers the toner image onto the sheet P.

The process units 1Y, 1M, 1C, and 1Bk basically have similar constructions, respectively. However, the process units 1Y, 1M, 1C, and 1Bk contain toners, serving as developers, in different colors, that is, yellow, magenta, cyan, and black, respectively, which correspond to color separation components for a color image. For example, each of the process units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer device 8 includes an intermediate transfer belt 11, primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 are pressed against the photoconductors 2, respectively, via the intermediate transfer belt 11, thus forming primary transfer nips between the intermediate transfer belt 11 and the photoconductors 2. The secondary transfer roller 13 contacts an outer circumferential surface of the intermediate transfer belt 11 to form a secondary transfer nip therebetween.

The fixing portion 300 includes a fixing device 20 serving as a heating device that heats the sheet P transferred with the toner image. The fixing device 20 includes a fixing belt 21 and a pressure roller 22. The fixing belt 21 heats the toner image on the sheet P. The pressure roller 22 contacts the fixing belt 21 to form a nip (e.g., a fixing nip) therebetween.

The recording medium supply portion 400 includes a sheet tray 14 (e.g., a paper tray) and a feed roller 15. The sheet tray 14 loads a plurality of sheets P serving as recording media. The feed roller 15 picks up and feeds a sheet P from the sheet tray 14. According to the embodiments below, a sheet (e.g., a sheet P) is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

The recording medium ejecting portion 500 includes an output roller pair 17 and an output tray 18. The output roller pair 17 ejects the sheet P onto the outside of the image forming apparatus 100. The output tray 18 is placed with the sheet P ejected by the output roller pair 17. The image forming apparatus 100 further includes a timing roller pair 16.

Referring to FIG. 1, a description is provided of printing processes performed by the image forming apparatus 100 according to the embodiment.

When the image forming apparatus 100 receives an instruction to start printing, a driver starts driving and rotating the photoconductor 2 of each of the process units 1Y, 1M, 1C, and 1Bk clockwise in FIG. 1 and the intermediate transfer belt 11 of the transfer device 8 counterclockwise in FIG. 1. The feed roller 15 starts rotation, feeding a sheet P from the sheet tray 14. As the sheet P fed by the feed roller 15 comes into contact with the timing roller pair 16, the timing roller pair 16 temporarily halts the sheet P. Thus, the timing roller pair 16 temporarily interrupts conveyance of the sheet P until the toner image, that is to be transferred onto the sheet P, is formed on the intermediate transfer belt 11.

The charger 3 of each of the process units 1Y, 1M, 1C, and 1Bk charges the surface of the photoconductor 2 evenly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the process units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11. Thus, the superimposed toner images form a full color toner image on the intermediate transfer belt 11. Alternatively, one of the four process units 1Y, 1M, 1C, and 1Bk may be used to form a monochrome toner image or two or three of the four process units 1Y, 1M, 1C, and 1Bk may be used to form a bicolor toner image or a tricolor toner image. After the toner image formed on the photoconductor 2 is transferred onto the intermediate transfer belt 11, the cleaner 5 removes residual toner and the like remaining on the photoconductor 2 therefrom.

The full color toner image formed on the intermediate transfer belt 11 is conveyed to the secondary transfer nip defined by the secondary transfer roller 13 in accordance with rotation of the intermediate transfer belt 11 and is transferred onto the sheet P conveyed by the timing roller pair 16. Thereafter, the sheet P transferred with the full color toner image is conveyed to the fixing device 20 where the fixing belt 21 and the pressure roller 22 fix the full color toner image on the sheet P under heat and pressure. The sheet P is conveyed to the recording medium ejecting portion 500 where the output roller pair 17 ejects the sheet P onto the output tray 18. Thus, a series of printing processes is finished.

Figure 2:
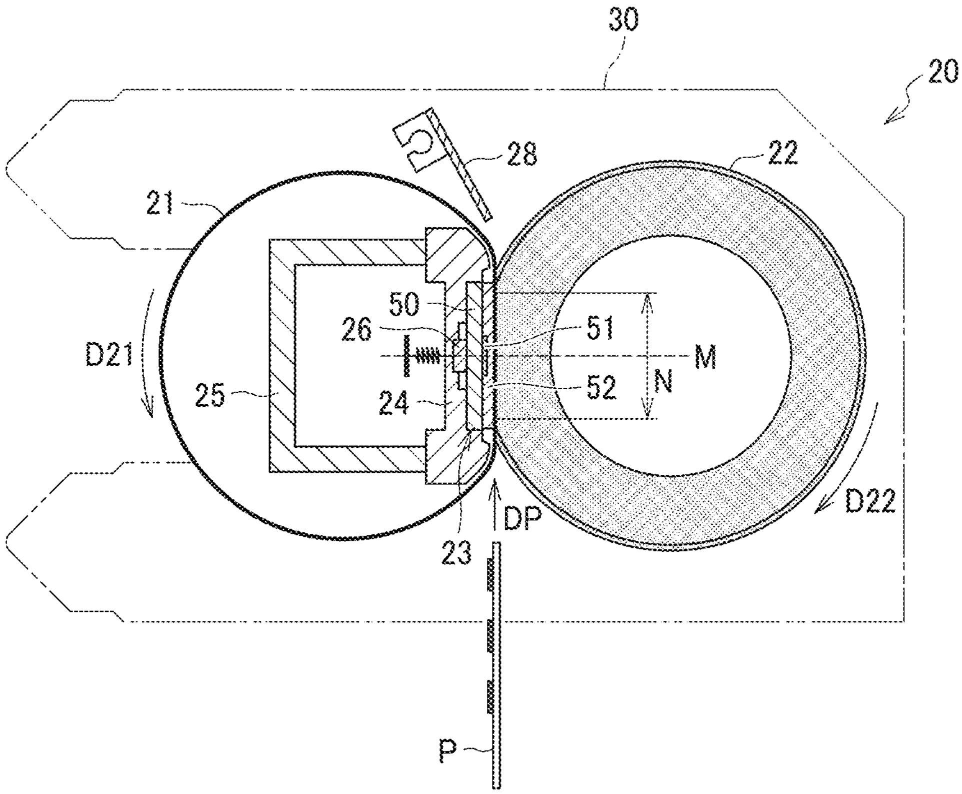
FIG. 2 is a cross-sectional view of a fixing device according to an embodiment of the present disclosure, that is incorporated in the image forming apparatus depicted in FIG. 1, illustrating a cross section of a center portion of the fixing device in a longitudinal direction thereof.
Figure 3:
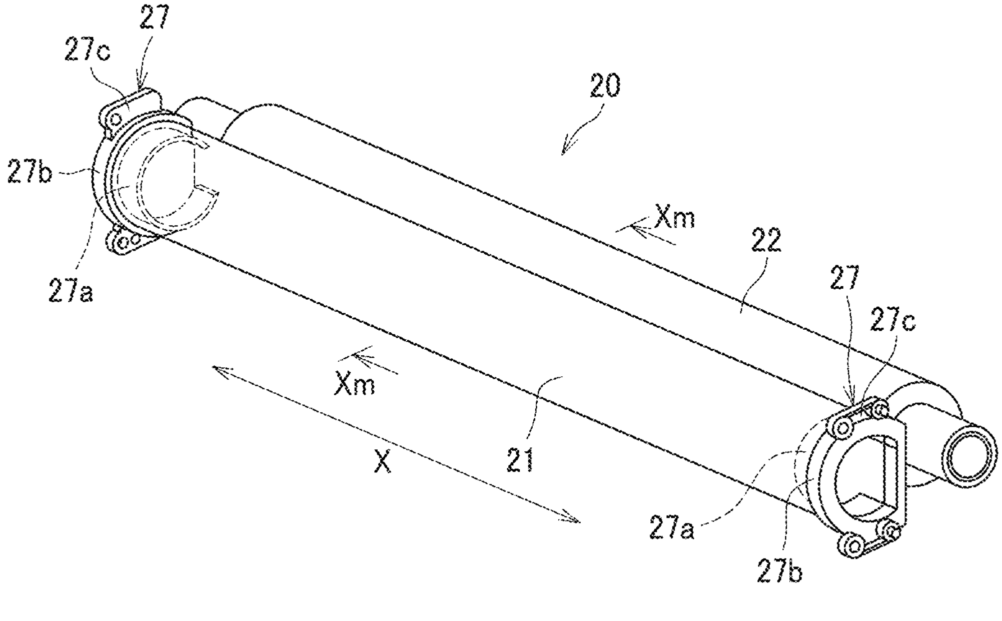
FIG. 3 is a perspective view of the fixing device depicted in FIG. 2.

Referring to FIGS. 2 and 3, a description is provided of a basic construction of the fixing device 20 according to an embodiment of the present disclosure.

FIG. 2 is a center cross-sectional view of the fixing device 20 according to the embodiment, taken on a center Xm-Xm depicted in FIG. 3 of the fixing belt 21 in a longitudinal direction thereof. FIG. 3 is a perspective view of the fixing device 20 according to the embodiment. In a description below, the longitudinal direction of the fixing belt 21 denotes a direction that is perpendicular to a rotation direction D21 of the fixing belt 21 and is extended along an outer circumferential face of the fixing belt 21. For example, the longitudinal direction of the fixing belt 21 denotes a longitudinal direction X depicted in FIG. 3 and is parallel to a longitudinal direction or an axial direction of the pressure roller 22 or a width direction of the sheet P passing through a fixing nip N formed between the fixing belt 21 and the pressure roller 22. The width direction of the sheet P is perpendicular to a sheet conveyance direction DP in which the sheet P is conveyed.

As illustrated in FIG. 2, in addition to the fixing belt 21 and the pressure roller 22, the fixing device 20 according to the embodiment includes a heater 23, a heater holder 24, a stay 25, a temperature sensor 26, a separator 28, and support frames 30. FIG. 3 omits illustration of the separator 28 and the support frames 30.

The fixing belt 21 serves as a rotator (e.g., a first rotator or a fixing rotator) that contacts an unfixed toner image bearing side of a sheet P, which bears an unfixed toner image, and fixes the unfixed toner image (e.g., unfixed toner) on the sheet P.

For example, the fixing belt 21 is an endless belt that includes a base layer serving as an inner circumferential surface layer, an elastic layer being disposed on the base layer, and a release layer being disposed on the elastic layer and serving as an outer circumferential surface layer. For example, the base layer has a layer thickness in a range of from 30 μm to 50 μm and is made of a metal material such as nickel and stainless steel or a resin material such as polyimide. The elastic layer has a layer thickness in a range of from 100 μm to 300 μm and is made of a rubber material such as silicone rubber, silicone rubber foam, and fluororubber. Since the fixing belt 21 incorporates the elastic layer, the elastic layer prevents slight surface asperities from being produced on a surface of the fixing belt 21 at the fixing nip N. Accordingly, heat is quickly conducted from the fixing belt 21 to the toner image on the sheet P evenly. The release layer has a layer thickness in a range of from 10 μm to 50 μm. The release layer is made of perfluoroalkoxy alkane (PFA), polytetrafluoroethylene (PTFE), polyimide, polyether imide, polyether sulfone (PES), or the like. As the fixing belt 21 incorporates the release layer, the release layer facilitates separation and peeling of toner of the toner image formed on the sheet P from the fixing belt 21. In order to decrease a size and a thermal capacity of the fixing belt 21, the fixing belt 21 preferably has a total thickness not greater than 1 mm and a diameter not greater than 30 mm.

As illustrated in FIG. 3, the fixing device 20 further includes belt holders 27, serving as a pair of rotator holders, that contact both lateral ends of the fixing belt 21, respectively, in the longitudinal direction X thereof. The belt holders 27 rotatably hold the fixing belt 21. In the description below, both lateral ends and a lateral end of the fixing belt 21 in the longitudinal direction X thereof are not limited to both outermost lateral edge portions and an outermost lateral edge portion of the fixing belt 21 in the longitudinal direction X thereof, respectively. In addition to both outermost lateral edge portions and the outermost lateral edge portion of the fixing belt 21 in the longitudinal direction X thereof, both lateral ends and the lateral end of the fixing belt 21 in the longitudinal direction X thereof also denote an arbitrary position within a span having a length from an edge to a divided position on the fixing belt 21 in the longitudinal direction X thereof when the fixing belt 21 is divided into three equal parts in the longitudinal direction X thereof. Accordingly, the belt holder 27 holds or supports a region (e.g., the lateral end of the fixing belt 21) encompassing an outermost lateral edge of the fixing belt 21 in the longitudinal direction X thereof. Additionally, the belt holder 27 may hold or support a region (e.g., the lateral end of the fixing belt 21) not encompassing a lateral edge of the fixing belt 21 in the longitudinal direction X thereof.

For example, the belt holder 27 includes an insertion portion 27*a*, a restricting portion 27*b*, and a secured portion 27*c*. The insertion portion 27*a* is C-shaped in cross section and is inserted into an interior within a loop formed by the fixing belt 21 at the lateral end of the fixing belt 21 in the longitudinal direction X thereof. The restricting portion 27*b* has an outer diameter that is greater than an outer diameter of the insertion portion 27*a*. The secured portion 27*c* is secured to the support frame 30 depicted in FIG. 2. The restricting portion 27*b* has an outer diameter that is greater than at least an outer diameter of the fixing belt 21. If the fixing belt 21 is skewed or moved in the longitudinal direction X thereof, the restricting portion 27*b* restricts skew or motion of the fixing belt 21. Conversely, the insertion portion 27*a* has a diameter that is not greater than an inner diameter of the fixing belt 21. As the insertion portion 27*a* is inserted into the interior within the loop formed by the fixing belt 21 at the lateral end of the fixing belt 21 in the longitudinal direction X thereof, the insertion portion 27*a* contacts an inner circumferential face of the fixing belt 21, thus rotatably holding or supporting the fixing belt 21. The secured portion 27*c* is secured to the support frame 30 disposed opposite each lateral end of the fixing belt 21 in the longitudinal direction X thereof. Accordingly, each of the support frames 30 rotatably supports the fixing belt 21 through the belt holder 27 at each lateral end of the fixing belt 21 in the longitudinal direction X thereof.

The pressure roller 22 serves as a rotator (e.g., a second rotator or an opposed rotator) that is disposed opposite the outer circumferential face of the fixing belt 21. The pressure roller 22 rotates in a rotation direction D22. The pressure roller 22 also serves as a pressure rotator or a pressure member that presses against the outer circumferential face of the fixing belt 21. The pressure roller 22 contacts the outer circumferential face of the fixing belt 21 to form the fixing nip N therebetween, through which the sheet P is conveyed.

For example, the pressure roller 22 includes a core metal that is solid and made of iron, an elastic layer that is disposed on an outer circumferential face of the core metal, and a release layer that is disposed on an outer circumferential face of the elastic layer. Alternatively, the core metal may be hollow. The elastic layer is made of silicone rubber, silicone rubber foam, fluororubber, or the like. The release layer is made of fluororesin such as PFA and PTFE.

The heater 23 serves as a heat source that heats the fixing belt 21. Alternatively, the fixing device 20 may include another heater that heats the pressure roller 22. According to the embodiment, the heater 23 is used as a heat source (e.g., a laminated heater or a platy heater) that includes resistive heat generators 5I. The heater 23 contacts the inner circumferential face of the fixing belt 21. Hence, as the resistive heat generators 51 generate heat when the heater 23 is energized, the heat is conducted to the inner circumferential face of the fixing belt 21, heating the fixing belt 21. Alternatively, instead of the heater 23 according to the embodiment, that is, the laminated heater or the platy heater, as the heat source, the fixing device 20 may incorporate a heater employing a radiant heating system, such as a halogen heater, a carbon heater, and a ceramic heater, or a heater employing an electromagnetic induction heating system.

The heater holder 24 is disposed within the loop formed by the fixing belt 21 and serves as a heat source holder that holds the heater 23 serving as a heat source. Since the heater holder 24 is subject to a high temperature by heat from the heater 23, the heater holder 24 is made of a heat-resistant material. For example, if the heater holder 24 is made of heat-resistant resin having a decreased thermal conductivity, such as liquid crystal polymer (LCP), the heater holder 24 suppresses conduction of heat thereto from the heater 23, facilitating heating of the fixing belt 21.

The stay 25 serves as a reinforcement that reinforces the heater holder 24. The stay 25 supports an opposite face of the heater holder 24, that is opposite to a pressure roller opposed face of the heater holder 24, that is disposed opposite the pressure roller 22, thus preventing the heater holder 24 and the heater 23 from being bent by pressure from the pressure roller 22, for example, preventing a bend of the heater holder 24 and the heater 23 in the longitudinal direction X of the fixing belt 21. Thus, the stay 25 causes the heater 23 to form the fixing nip N that has an even length in the sheet conveyance direction DP throughout an entire span of the fixing belt 21 in the longitudinal direction X thereof. The stay 25 is preferably made of a ferrous metal material such as stainless used steel (SUS) and steel electrolytic cold commercial (SECC) to achieve rigidity.

The temperature sensor 26 serves as a temperature detector that contacts the heater 23 and detects a temperature of the heater 23. According to the embodiment, the temperature sensor 26 contacts an opposite face of the heater 23, that is opposite to a nip opposed face of the heater 23, that is disposed opposite the fixing nip N. The temperature sensor 26 is a contact type temperature sensor that contacts the heater 23. Alternatively, the temperature sensor 26 may be a non-contact type temperature sensor that does not contact the heater 23. For example, general temperature sensors such as a thermopile, a thermostat, a thermistor, and a normally closed (NC) sensor are used as the temperature sensor 26.

The separator 28 separates the sheet P that has passed through the fixing nip N from the outer circumferential face of the fixing belt 21. The separator 28 is made of a metal material such as rust proof iron, stainless steel, and aluminum, for example. The separator 28 is disposed downstream from the fixing nip N in the sheet conveyance direction DP. The separator 28 includes a front edge (e.g., a lower end in FIG. 2) that is disposed downstream from the fixing nip N in the sheet conveyance direction DP and disposed in proximity to the outer circumferential face of the fixing belt 21. Hence, when the sheet P passes through the fixing nip N and reaches the front edge of the separator 28, as a leading end of the sheet P comes into contact with the front edge of the separator 28, the separator 28 separates the sheet P from the outer circumferential face of the fixing belt 21.

The support frames 30 are metal frames that support both lateral ends of the fixing belt 21 and the pressure roller 22, respectively, in the longitudinal direction X thereof. In addition to the fixing belt 21 and the pressure roller 22, the support frames 30 also support both lateral ends of the stay 25 and the separator 28, respectively, in the longitudinal direction X thereof.

Figure 4:
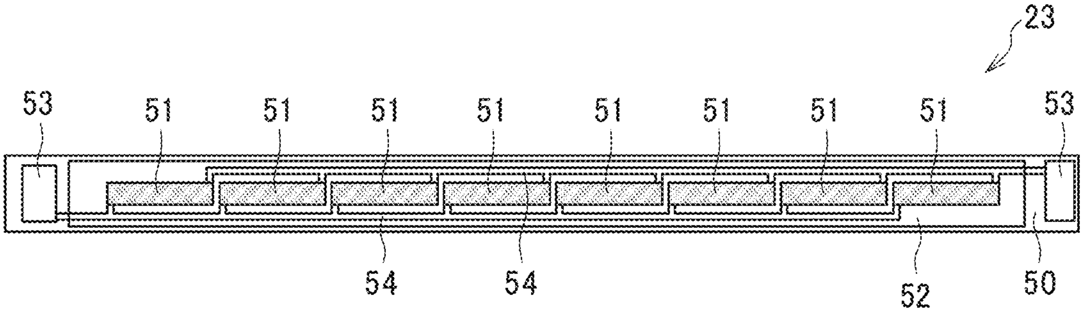
FIG. 4 is a plan view of a heater incorporated in the fixing device depicted in FIG. 2.

FIG. 4 is a plan view of the heater 23 according to the embodiment.

As illustrated in FIG. 4, the heater 23 according to the embodiment includes a base 50 (e.g., a substrate) that is platy, the plurality of resistive heat generators 51 that is disposed on the base 50, an insulating layer 52 that coats the resistive heat generators 51, a pair of electrodes 53, and a plurality of feeders 54. The electrodes 53 are electrically connected to the resistive heat generators 51 through the feeders 54.

The base 50 is a plate elongated horizontally in FIG. 4. The base 50 is elongated in a longitudinal direction that is parallel to the longitudinal direction X of the fixing belt 21 depicted in FIG. 3. The base 50 is preferably made of ceramics, such as alumina and aluminum nitride, or a nonmetallic material, such as glass and mica, having an enhanced heat resistance and an enhanced insulation. Alternatively, the heater 23 may further include an insulating layer that is interposed between the base 50 and the resistive heat generators 51. In this case, the base 50 is made of a conductive material such as metal. For example, the metal is preferably aluminum, stainless steel, or the like that is available at reduced costs. In order to improve evenness of heat conducted from the heater 23 so as to enhance quality of an image formed on a sheet P, the base 50 may be made of a material that has an increased thermal conductivity such as copper, graphite, and graphene.

The resistive heat generators 51 serve as heat generators that generate heat as power is supplied to the resistive heat generators 51. The resistive heat generators 51 are arranged in the longitudinal direction of the base 50 with a gap between the adjacent resistive heat generators 51. The adjacent resistive heat generators 51 define the gap therebetween, that is 0.2 mm or greater, preferably 0.4 mm or greater, in view of ensuring insulation between the adjacent resistive heat generators 51. If the gap between the adjacent resistive heat generators 51 is excessively great, the fixing belt 21 is subject to temperature decrease at an opposed portion thereof that is disposed opposite the gap. Hence, the gap is 5 mm or smaller, preferably 1 mm or smaller, in view of suppressing uneven temperature of the fixing belt 21 in the longitudinal direction X thereof. For example, each of the resistive heat generators 51 is produced as below. Silver-palladium (AgPd), glass powder, and the like are mixed into paste. The paste coats the base 50 by screen printing or the like. Thereafter, the base 50 is subject to firing. Alternatively, each of the resistive heat generators 51 may be made of a resistive material such as a silver alloy (AgPt) and ruthenium oxide ($RuO_2$).

The resistive heat generators 51 are electrically connected to the electrodes 53 through the feeders 54. According to the embodiment, the electrodes 53 are mounted on both lateral ends of the base 50, respectively, in the longitudinal direction thereof. The resistive heat generators 51 are electrically connected in parallel to the electrodes 53. As a connector serving as a feeding member is connected to the electrodes 53, a power supply is ready to supply power to the resistive heat generators 51.

The insulating layer 52 covers the resistive heat generators 51 and the feeders 54, ensuring insulation and durability of the resistive heat generators 51 and the feeders 54. Conversely, since each of the electrodes 53 is connected to the connector, each of the electrodes 53 is not covered by the insulating layer 52 and is exposed. The insulating layer 52 is made of heat-resistant glass or the like, for example. According to the embodiment, as illustrated in FIG. 2, the base 50 includes a fixing belt opposed face that is disposed opposite the fixing belt 21 and the fixing nip N. The fixing belt opposed face mounts the resistive heat generators 51, the electrodes 53, the feeders 54, and the insulating layer 52. Alternatively, the resistive heat generators 51, the electrodes 53, the feeders 54, and the insulating layer 52 may be mounted on a heater holder opposed face of the base 50, that is disposed opposite the heater holder 24. In this case, heat generated by the resistive heat generators 51 is conducted to the fixing belt 21 through the base 50. Hence, the base 50 is preferably made of a material having an enhanced thermal conductivity, such as aluminum nitride.

A description is provided of operation of the fixing device 20 according to the embodiment.

As the image forming apparatus 100 starts a print job, a driver drives and rotates the pressure roller 22 clockwise in FIG. 2 in the rotation direction D22. The pressure roller 22 drives and rotates the fixing belt 21. As the heater 23 is energized, the heater 23 generates heat, heating the fixing belt 21. The temperature sensor 26 detects a temperature of the heater 23. The image forming apparatus 100 further includes a controller that controls a heat generation amount of the heater 23 based on the temperature of the heater 23, that is detected by the temperature sensor 26, thus retaining a predetermined fixing temperature of the fixing belt 21 at which the fixing belt 21 fixes an unfixed toner image on a sheet P. As the sheet P bearing the unfixed toner image is conveyed through the fixing nip N formed between the fixing belt 21 and the pressure roller 22, the fixing belt 21 and the pressure roller 22 heat and press the sheet P. Thus, the fixing belt 21 and the pressure roller 22 fix the unfixed toner image on the sheet P. Thereafter, after the sheet P passes through the fixing nip N, the separator 28 separates the sheet P from the outer circumferential face of the fixing belt 21.

A description is provided of a construction of a comparative fixing device.

The comparative fixing device includes a rotator, a pair of support frames (e.g., side walls) that supports the rotator, and two coupling frames that couple the support frames. The two coupling frames are disposed at a front and a rear of the comparative fixing device, respectively. The rotator is interposed between the two coupling frames. The coupling frames that are disposed at two positions, that is, the front and the rear of the comparative fixing device, respectively, support the support frames, improving rigidity and mechanical strength of an entirety of the support frames.

However, since the coupling frames are disposed at the two positions, that is, the front and the rear of the comparative fixing device, the coupling frames may increase a size, a weight, and manufacturing costs of the comparative fixing device.

The fixing device 20 according to the embodiment includes the pair of support frames 30. Hence, in order to retain a predetermined distance between the support frames 30 and enhance rigidity and mechanical strength of an entirety of the support frames 30, the fixing device 20 preferably includes a coupling frame that couples one of the support frames 30 with another one of the support frames 30. However, if the fixing device 20 incorporates two coupling frames that are disposed at two positions, that is, a front and a rear of the fixing device 20, and disposed between the support frames 30, like the comparative fixing device described above, although the entirety of the support frames 30 attains improved rigidity and mechanical strength, the coupling frames may increase a size, a weight, and manufacturing costs of the fixing device 20.

To address the circumstance, in order to decrease the size, the weight, and the manufacturing costs of the fixing device 20, the fixing device 20 according to an embodiment of the present disclosure has a construction described below.

A description is provided of the construction of the fixing device 20 according to the embodiment of the present disclosure.

Figure 5:
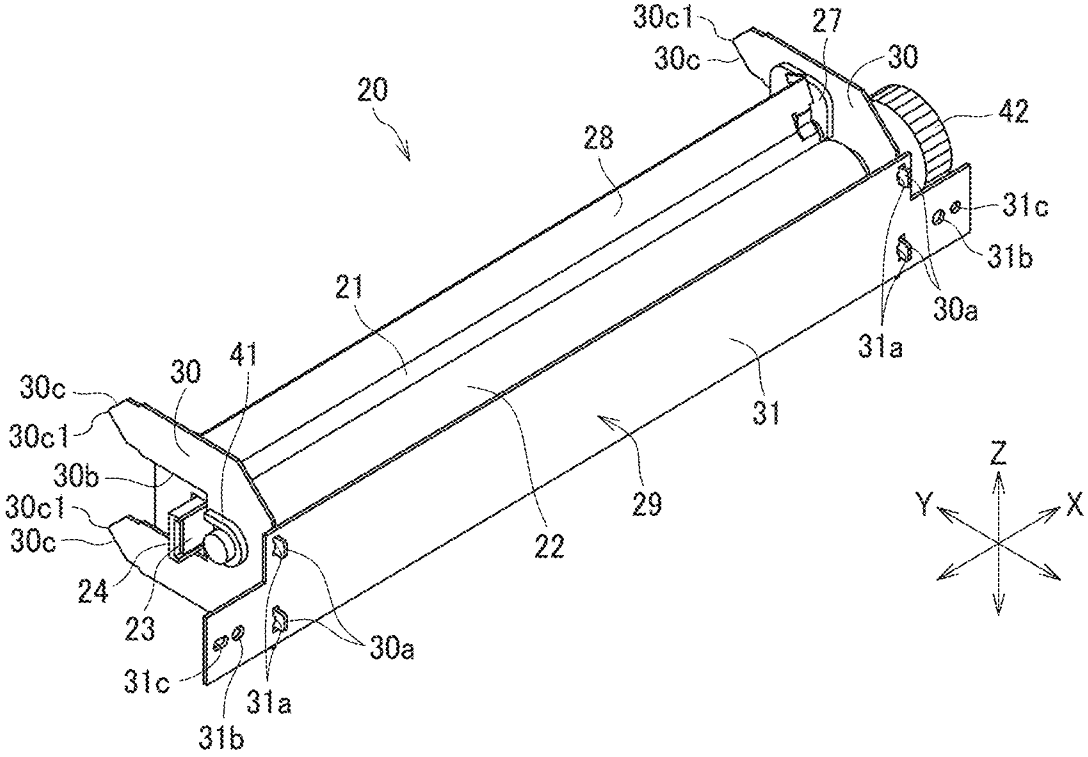
FIG. 5 is a perspective view of the fixing device depicted in FIG. 2.

FIG. 5 is a perspective view of the fixing device 20 according to the embodiment of the present disclosure.

As illustrated in FIG. 5, the fixing device 20 according to the embodiment includes a device frame 29 that is attached with various elements such as the fixing belt 21 and the pressure roller 22. The device frame 29 includes the single coupling frame 31 in addition to the pair of support frames 30.

As illustrated in FIG. 5, the fixing belt 21 and the pressure roller 22 extend in the longitudinal direction X (e.g., X-axis). The coupling frame 31 extends in the longitudinal direction X. The coupling frame 31 includes both lateral ends in the longitudinal direction X, that are coupled with the support frames 30, respectively. For example, the coupling frame 31 includes a plurality of coupling holes 31*a* that is disposed at each lateral end of the coupling frame 31 in the longitudinal direction X thereof. Each of the support frames 30 includes a plurality of engaging projections 30*a*. As the engaging projections 30*a* are inserted into and engaged with the coupling holes 31*a*, respectively, each of the support frames 30 is coupled with the coupling frame 31. Thus, the support frames 30 are coupled with each other through the coupling frame 31.

The coupling frame 31 further includes a pair of screw through holes 31*b* and a pair of positioning holes 31*c*. Screws are inserted into the screw through holes 31*b*, respectively, to secure the coupling frame 31 to a body frame of the image forming apparatus 100 described below. The positioning holes 31*c* position the coupling frame 31 to the body frame. Each of the screw through hole 31*b* and the positioning hole 31*c* is disposed outboard from the coupling hole 31*a* in the longitudinal direction X of the coupling frame 31 such that the screw through hole 31*b* and the positioning hole 31*c* are disposed closer to a lateral edge of the coupling frame 31 in the longitudinal direction X thereof than the coupling hole 31*a* is.

Each of the support frames 30 includes a recess 30*b* (e.g., a notch) into which a rotation shaft of the pressure roller 22 and a lateral end of each of the heater 23 and the heater holder 24 in the longitudinal direction X thereof are inserted. The recess 30*b* has an opening (e.g., a mouth) disposed at one end of the support frame 30, that is opposite to another end of the support frame 30, that is disposed opposite the coupling frame 31. The rotation shaft of the pressure roller 22 and the lateral end of each of the heater 23 and the heater holder 24 are inserted into an inside of the recess 30*b* through the opening. Thus, the pressure roller 22, the heater 23, and the heater holder 24 are installed in the fixing device 20. The recess 30*b* includes a bottom that mounts a plain bearing 41 that rotatably supports the rotation shaft of the pressure roller 22.

The fixing device 20 further includes a driving force transmission gear 42 that is disposed on one lateral end of the rotation shaft of the pressure roller 22 in the axial direction thereof. In a state in which the pressure roller 22 is attached to the support frames 30, the driving force transmission gear 42 is disposed outboard from one of the support frames 30, that is, the right, support frame 30 in FIG. 5, in the longitudinal direction X of the pressure roller 22. The driving force transmission gear 42 receives a driving force from the driver disposed inside the image forming apparatus 100 and transmits the driving force to the pressure roller 22. As the fixing device 20 is installed in the image forming apparatus 100, the driving force transmission gear 42 engages an apparatus gear disposed inside the image forming apparatus 100. Thus, the apparatus gear is ready to transmit the driving force from the driver to the pressure roller 22 through the driving force transmission gear 42.

Each of the support frames 30 further includes a plurality of attachment portions 30*c*. The attachment portion 30*c* is disposed at one end of the support frame 30, that is opposite to another end of the support frame 30, that is disposed opposite the coupling frame 31. The attachment portion 30*c* is attached to the body frame. FIG. 5 illustrates a first orthogonal direction Y (e.g., Y-axis) that is perpendicular to the longitudinal direction X (e.g., X-axis) and a second orthogonal direction Z (e.g., Z-axis) that is perpendicular to the longitudinal direction X and the first orthogonal direction Y The two attachment portions 30*c* are disposed at one end of each of the support frames 30, that is opposite to another end of each of the support frames 30, that is disposed opposite the coupling frame 31, in the first orthogonal direction Y The two attachment portions 30*c* are disposed opposite each other with a clearance therebetween in the second orthogonal direction Z. A number of the attachment portions 30*c* is not limited to two. For example, the number of the attachment portions 30*c* may be one or three or more.

Figure 6:
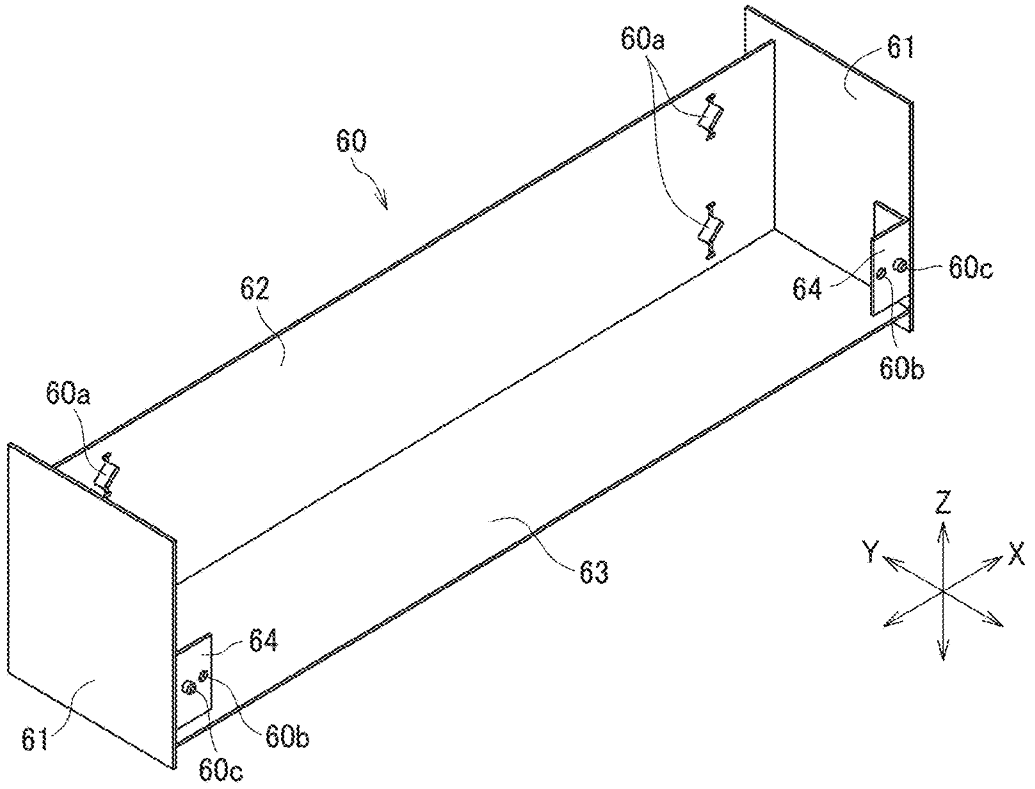
FIG. 6 is a perspective view of a body frame incorporated in the image forming apparatus depicted in FIG. 1.

Referring to FIG. 6, a description is provided of a construction of the body frame of the image forming apparatus 100, to which the fixing device 20 is attached.

FIG. 6 illustrates the longitudinal direction X (e.g., X-axis), the first orthogonal direction Y (e.g., Y-axis), and the second orthogonal direction Z (e.g., Z-axis) that are equivalent to the longitudinal direction X, the first orthogonal direction Y, and the second orthogonal direction Z depicted in FIG. 5.

As illustrated in FIG. 6, the image forming apparatus 100 according to the embodiment depicted in FIG. 1 includes a body frame 60 that includes a pair of side walls 61, a vertical wall 62, and a bottom wall 63. The side walls 61 are spaced apart from each other in the longitudinal direction X of the body frame 60. The vertical wall 62 is interposed between the side walls 61 and is perpendicular to the first orthogonal direction Y. The bottom wall 63 is interposed between the side walls 61 and is perpendicular to the second orthogonal direction Z.

The body frame 60 includes a plurality of holes 60*a* that is disposed at each lateral end of the vertical wall 62 in the longitudinal direction X thereof. The attachment portions 30*c* of the support frames 30 are inserted into the holes 60*a*, respectively, so that the support frames 30 are attached to the body frame 60. The two holes 60*a* are disposed at each lateral end of the vertical wall 62 in the longitudinal direction X of the body frame 60. The two holes 60*a* are disposed opposite each other with a clearance therebetween in the second orthogonal direction Z and disposed opposite the attachment portions 30*c*, respectively.

The body frame 60 further includes tabs 64 (e.g., protrusions) that are mounted on front portions of the side walls 61, respectively. The front portions are opposite to rear portions of the side walls 61, respectively, in the first orthogonal direction Yin FIG. 6. The rear portions mount the vertical wall 62. Each of the tabs 64 is provided with a screw hole 60*b* and a positioning projection 60*c*. A screw that fastens the fixing device 20 to the body frame 60 is inserted into the screw hole 60*b*. The positioning projection 60*c* positions the fixing device 20 with respect to the body frame 60.

Figure 7:
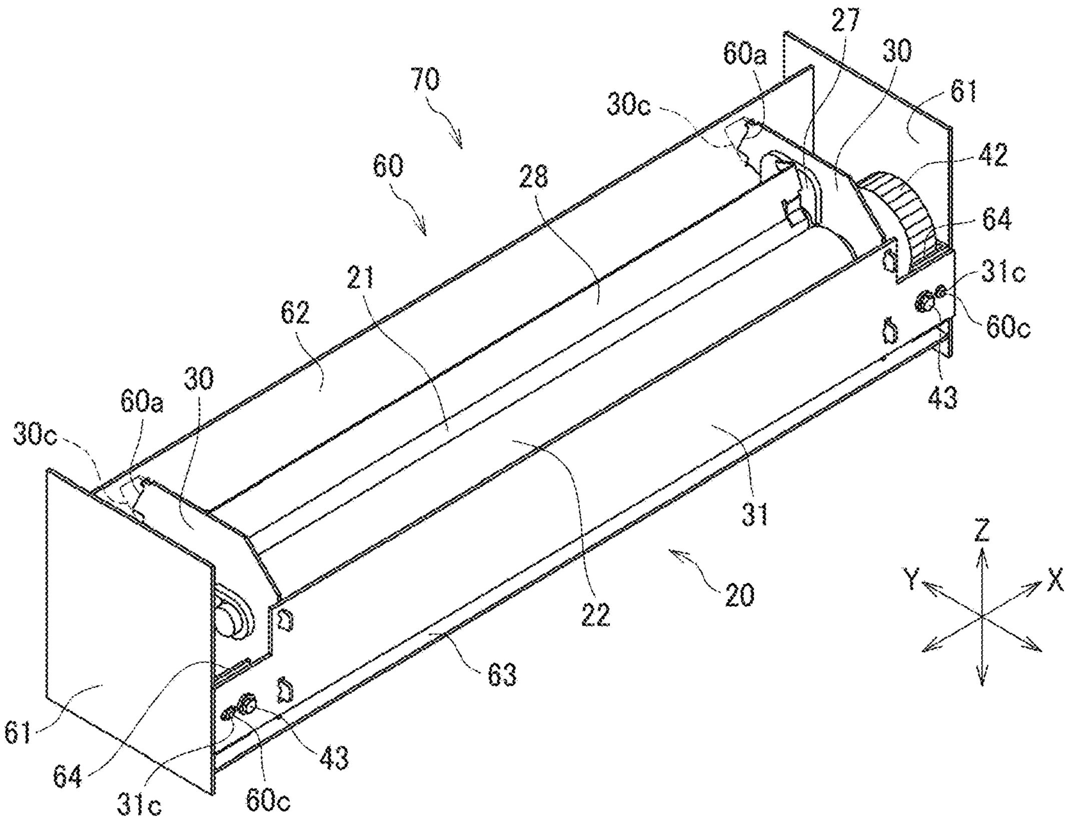
FIG. 7 is a perspective view of the fixing device depicted in FIG. 5 that is attached to the body frame depicted in FIG. 6.

FIG. 7 illustrates the fixing device 20 attached to the body frame 60. The body frame 60, the fixing belt 21, the pressure roller 22, and the support frames 30 construct a frame device 70.

As illustrated in FIG. 7, in a state in which the fixing device 20 is attached to the body frame 60, the fixing device 20 is interposed between the side walls 61.

In order to attach the fixing device 20 to the body frame 60, the attachment portions 30*c* of the support frames 30 are inserted into the holes 60*a* of the body frame 60, respectively. Accordingly, the attachment portions 30*c* engage the holes 60*a*, respectively, positioning the support frames 30 with respect to the body frame 60 in the longitudinal direction X and the second orthogonal direction Z thereof.

According to the embodiment, in order to prevent interference of the attachment portions 30*c* and the holes 60*a* due to dimensional tolerance or the like and facilitate insertion of the attachment portions 30*c* into the holes 60*a*, respectively, the lower, attachment portions 30*c* in FIG. 5 are not positioned with respect to the body frame 60 in the second orthogonal direction Z. For example, the upper, attachment portions 30*c* in FIGS. 5 and 7 are positioned with respect to the body frame 60 in both the longitudinal direction X and the second orthogonal direction Z. Conversely, the lower, attachment portions 30*c* in FIG. 5 are positioned with respect to the body frame 60 in the longitudinal direction X and are not positioned with respect to the body frame 60 in the second orthogonal direction Z. Among the plurality of attachment portions 30*c* of each of the support frames 30, one of the attachment portions 30*c* is positioned with respect to the body frame 60 in the second orthogonal direction Z and another one of the attachment portions 30*c* is not positioned with respect to the body frame 60 in the second orthogonal direction Z. Thus, the attachment portion 30*c* and the hole 60*a* position each of the support frames 30 with respect to the body frame 60 in the second orthogonal direction Z and facilitate insertion of the attachment portion 30*c* into the hole 60*a*.

Figure 8:
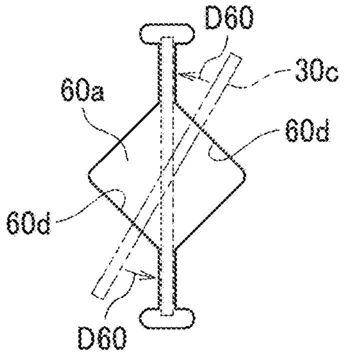
FIG. 8 is an enlarged front view of a hole of the body frame depicted in FIG. 6.

According to the embodiment, in order to facilitate insertion of the attachment portion 30*c* into the hole 60*a*, the attachment portion 30*c* is tapered toward a tip 30*c*1 of the attachment portion 30*c* to form a triangle as illustrate in FIG. 5. For example, the attachment portion 30*c* has a width that decreases gradually toward the tip 30*c*1 in an insertion direction (e.g., the first orthogonal direction Y) in which the attachment portion 30*c* is inserted into the hole 60*a*. As illustrated in FIG. 6, the hole 60*a* is a rectangle or a rhombus. For example, FIG. 8 illustrates the attachment portion 30*c* that is inserted in the hole 60*a* at a proper insertion position with a broken line and the attachment portion 30*c* that is inserted in the hole 60*a* at an improper insertion position with an alternate long and two short dashes line. Even if the attachment portion 30*c* inserted in the hole 60*a* is inclined from the proper insertion position to the improper insertion position and therefore has an improper insertion posture, the attachment portion 30*c* comes into contact with an edge 60*d* of the hole 60*a*, that is rectangular or rhomboid. Accordingly, the edge 60*d* guides the attachment portion 30*c* in a guide direction D60, correcting the improper insertion posture of the attachment portion 30*c* into a proper insertion posture. For example, the edge 60*d* that is rectangular or rhomboid serves as a guide that guides the attachment portion 30*c* to the proper insertion position. Thus, the attachment portion 30*c* is inserted into the hole 60*a* readily. Alternatively, each of the attachment portion 30*c* and the hole 60*a* may have shapes that are not limited to a shape according to the embodiment. For example, the attachment portion 30*c* or the hole 60*a* may be a taper having a diameter that decreases in the insertion direction in which the attachment portion 30*c* is inserted into the hole 60*a*. Yet alternatively, conversely to the construction of the fixing device 20 and the body frame 60 depicted in FIGS. 6 and 7, the attachment portion 30*c* may be a hole or a recess into which a projection of the body frame 60 is inserted.

Figure 9A:
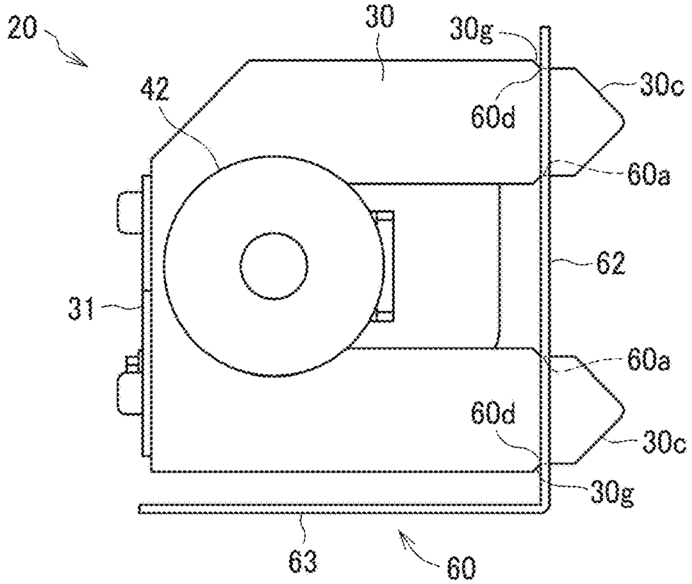
FIG. 9A is a side view of the fixing device depicted in FIG. 7 that is attached to the body frame.
Figure 9B:
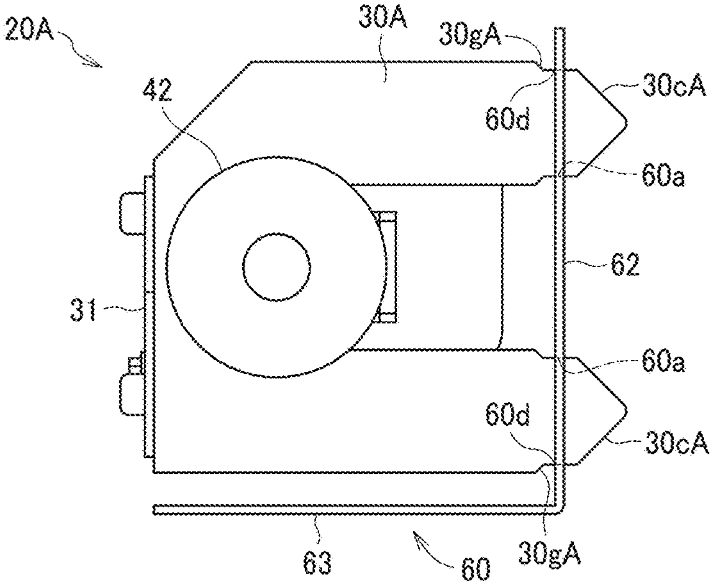
FIG. 9B is a side view of a fixing device as a variation of the fixing device depicted in FIG. 9A, that is attached to the body frame.

As illustrated in FIG. 9A, the attachment portion 30*c* includes a step 30*g*. In a state in which the attachment portion 30*c* is inserted in the hole 60*a*, the step 30*g* of the attachment portion 30*c* contacts the edge 60*d* of the hole 60*a*. FIG. 9B illustrates a fixing device 20A that includes a support frame 30A including an attachment portion 30*c*A. The attachment portion 30*c*A includes a step 30*g*A that does not contact the edge 60*d* of the hole 60*a*. For example, if the support frame 30 has a decreased mechanical strength or if the support frame 30 is exerted with an increased load, as illustrated in FIG. 9A, the step 30*g* of the attachment portion 30*c* preferably contacts the edge 60*d* of the hole 60*a*. Conversely, if the support frame 30A has an increased mechanical strength or if the support frame 30A is not exerted with an increased load, as illustrated in FIG. 9B, the step 30*g*A of the attachment portion 30*c*A does not contact the edge 60*d* of the hole 60*a*.

As illustrated in FIG. 7, in a state in which the attachment portions 30*c* are inserted in the holes 60*a* of the body frame 60, respectively, the coupling frame 31 of the fixing device 20 is disposed opposite the tabs 64 of the body frame 60. The positioning holes 31*c* of the coupling frame 31 are disposed opposite the positioning projections 60*c* mounted on the tabs 64, respectively. The positioning projections 60*c* are inserted into the positioning holes 31*c*, respectively. Accordingly, the positioning projections 60*c* engage the positioning holes 31*c*, respectively, positioning the coupling frame 31 with respect to the body frame 60 in the longitudinal direction X and the second orthogonal direction Z thereof.

Figure 10:
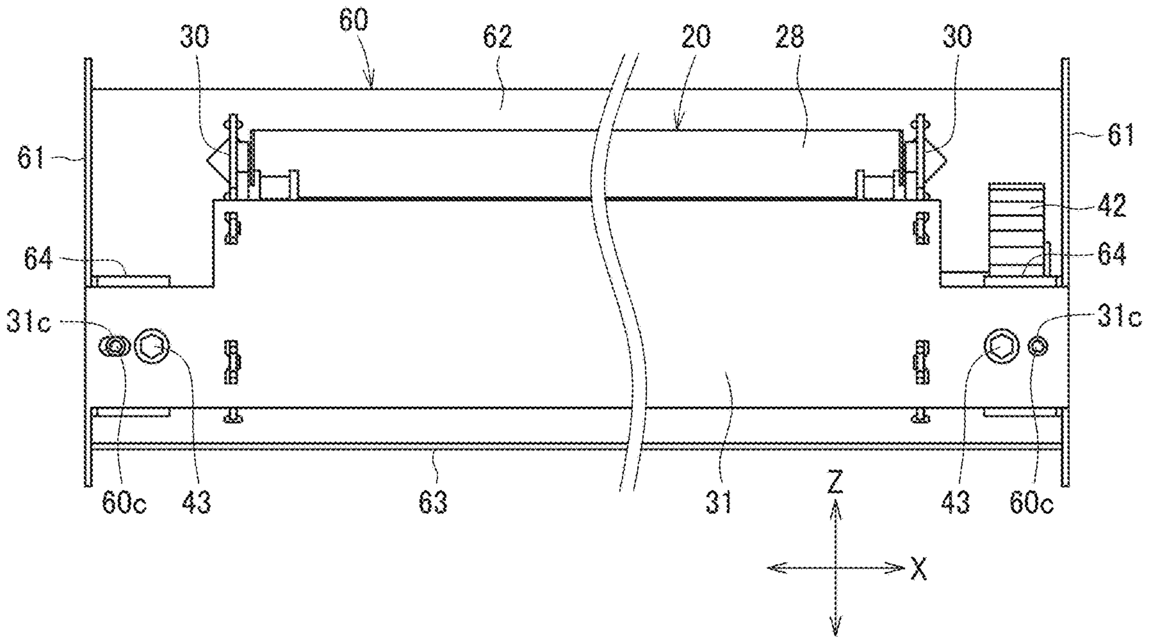
FIG. 10 is a front view of the fixing device depicted in FIG. 9A that is attached to the body frame.

According to the embodiment, as illustrated in FIG. 10, one of the positioning holes 31*c*, that is, the left, positioning hole 31*c* in FIG. 10, is an elongate hole that is elongated in the longitudinal direction X greater than the positioning projection 60*c*. Since one of the positioning holes 31*c* is the elongate hole, even if the positioning projection 60*c* is shifted with respect to the positioning hole 31*c* due to dimensional tolerance, thermal expansion, or the like, the positioning hole 31*c* does not interfere with the positioning projection 60*c*. Alternatively, conversely to the positioning holes 31*c* depicted in FIG. 10, the right, positioning hole 31*c* in FIG. 10 may be an elongate hole. According to the embodiment, the coupling frame 31 incorporates the positioning holes 31*c* that engage the positioning projections 60*c* of the body frame 60, respectively, to position the fixing device 20 with respect to the body frame 60. Alternatively, contrarily to the embodiment depicted in FIG. 10, the coupling frame 31 may incorporate positioning projections and the body frame 60 may incorporate positioning holes.

As illustrated in FIG. 7, the fixing device 20 further includes screws 43 that secure the coupling frame 31 to the tabs 64 of the body frame 60. For example, the screws 43 are inserted into the screw through holes 31*b* of the coupling frame 31 depicted in FIG. 5 and fastened to the screw holes 60*b* of the body frame 60 depicted in FIG. 6, respectively. Hence, the screws 43 secure the fixing device 20 to the body frame 60, preventing the fixing device 20 from moving in the first orthogonal direction Y and separating from the body frame 60. Thus, attachment of the fixing device 20 to the body frame 60 is finished.

As described above, in a state in which the fixing device 20 is attached to the body frame 60, the support frames 30 are positioned with respect to the body frame 60. For example, as the attachment portions 30*c* of the support frames 30 are inserted into and engaged with the holes 60*a* of the body frame 60, respectively, the support frames 30 are positioned with respect to the body frame 60 in the longitudinal direction X and the second orthogonal direction Z, retaining the predetermined distance between the support frames 30 in the longitudinal direction X.

As illustrated in FIG. 5, the fixing device 20 according to the embodiment does not incorporate a coupling frame that couples the support frames 30 and is disposed in proximity to the attachment portions 30*c* of each of the support frames 30. However, as described above, the fixing device 20 according to the embodiment is attached to the body frame 60. Hence, the support frames 30 are positioned with respect to the body frame 60, retaining the predetermined distance between the support frames 30. For example, according to the embodiment, even if the fixing device 20 does not incorporate the coupling frame that is disposed in proximity to the attachment portions 30*c*, the support frames 30 are attached to the body frame 60. Hence, the body frame 60 serves as a coupling frame that retains the predetermined distance between the support frames 30, improving rigidity and mechanical strength of the support frames 30.

Figure 11A:
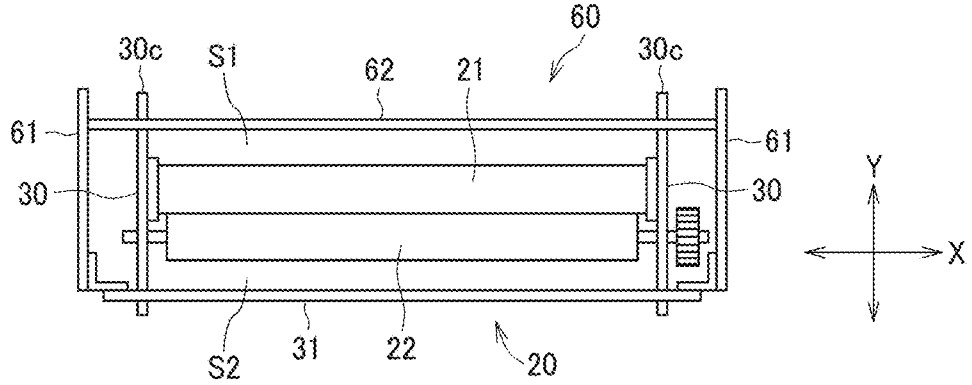
FIG. 11A is a plan view of the fixing device depicted in FIG. 10 that is attached to the body frame.
Figure 11B:
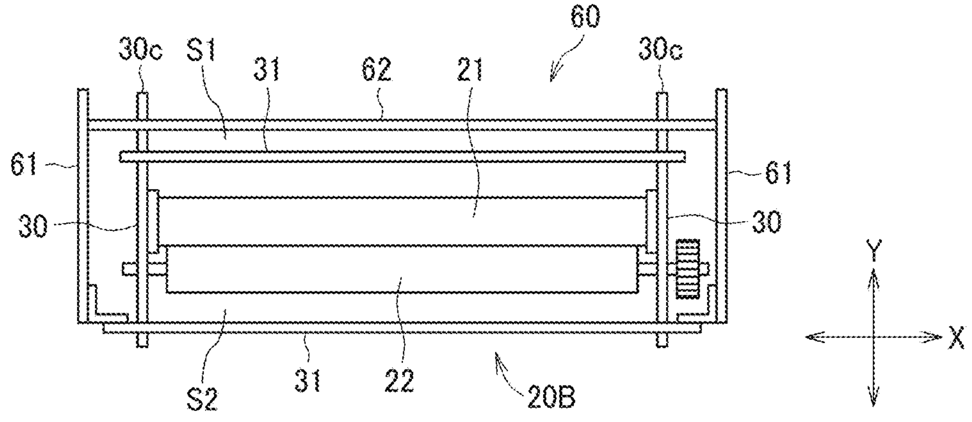
FIG. 11B is a plan view of a fixing device as a comparative example of the fixing device depicted in FIG. 11A, that is attached to the body frame.

As described above, according to the embodiment, even if the fixing device 20 does not incorporate the coupling frame that is disposed in an attachment portion side S1 of the fixing device 20 illustrated in FIG. 11A, that is defined by the fixing belt 21 and the pressure roller 22 and accommodates the attachment portions 30*c* of the support frames 30, as the fixing device 20 is attached to the body frame 60, the fixing device 20 retains the predetermined distance between the support frames 30 in the attachment portion side S1 of the fixing device 20. Hence, as illustrated in FIG. 11A, the fixing device 20 omits the coupling frame in the attachment portion side S1 (e.g., an upper part in FIG. 11A) of the fixing device 20. The attachment portion side S1 is opposite to a coupling frame side S2 of the fixing device 20, that accommodates the coupling frame 31. Accordingly, the fixing device 20 according to the embodiment decreases the size, the weight, and the manufacturing costs, compared to a fixing device 20B illustrated in FIG. 11B that incorporates the coupling frames 31 that are attached to an upper portion and a lower portion in FIG. 11B of each of the support frames 30, respectively.

As described above, the fixing device 20 according to the embodiment eliminates the coupling frame in the attachment portion side S1 of the fixing device 20, that accommodates the attachment portions 30*c*. The attachment portion side S1 is defined by the fixing belt 21 and the pressure roller 22 and interposed between the support frames 30. Thus, the fixing device 20 decreases the size, the weight, and the manufacturing costs of the fixing device 20. In a state in which the fixing device 20 is attached to the body frame 60, the fixing device 20 retains the predetermined distance between the support frames 30 and therefore ensures the rigidity and the mechanical strength of the entirety of the fixing device 20. Thus, the fixing device 20 according to the embodiment ensures the rigidity and the mechanical strength of the entirety of the fixing device 20 while decreasing the size, the weight, and the manufacturing costs of the fixing device 20.

According to the embodiment, even before the fixing device 20 is attached to the body frame 60, the fixing device 20 ensures the rigidity and the mechanical strength of the fixing device 20. For example, according to the embodiment, the coupling frame 31 is disposed in the coupling frame side S2 of the fixing device 20, that is interposed between the support frames 30 and is opposite to the attachment portion side S1 of the fixing device 20 via the fixing belt 21 and the pressure roller 22. Accordingly, the fixing device 20 ensures the rigidity and the mechanical strength in a stand-alone state before the fixing device 20 is attached to the body frame 60. Consequently, the fixing device 20 according to the embodiment is not deformed substantially when the fixing device 20 is installed into the image forming apparatus 100, facilitating proper installation of the fixing device 20 into the image forming apparatus 100.

Figure 12:
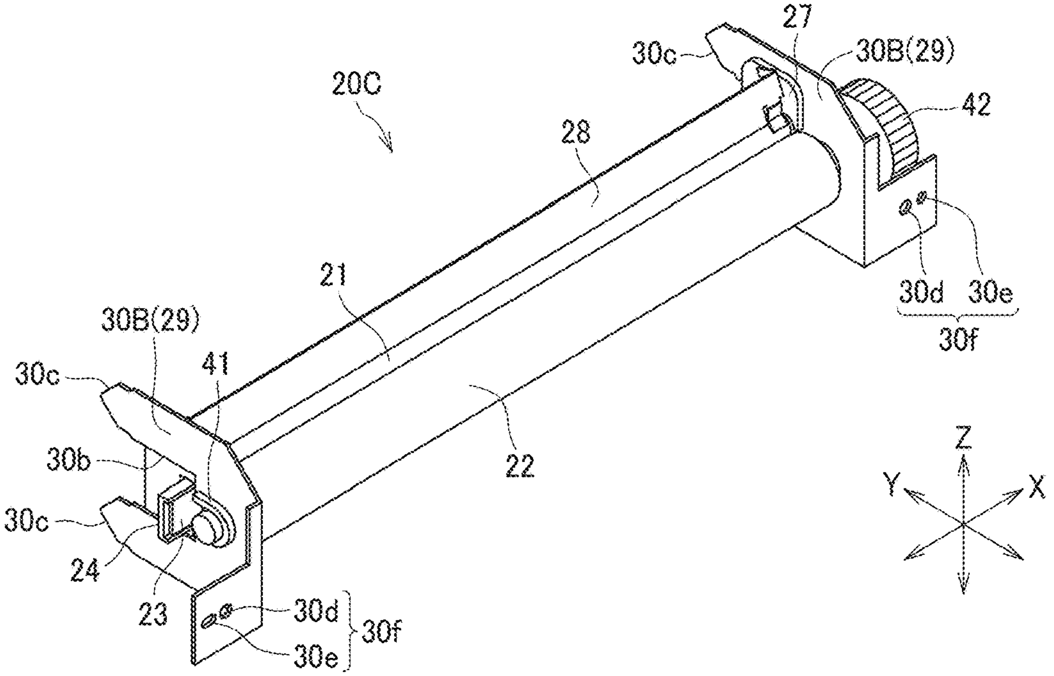
FIG. 12 is a perspective view of a fixing device according to another embodiment of the present disclosure, that is installable in the image forming apparatus depicted in FIG. 1.
Figure 13:
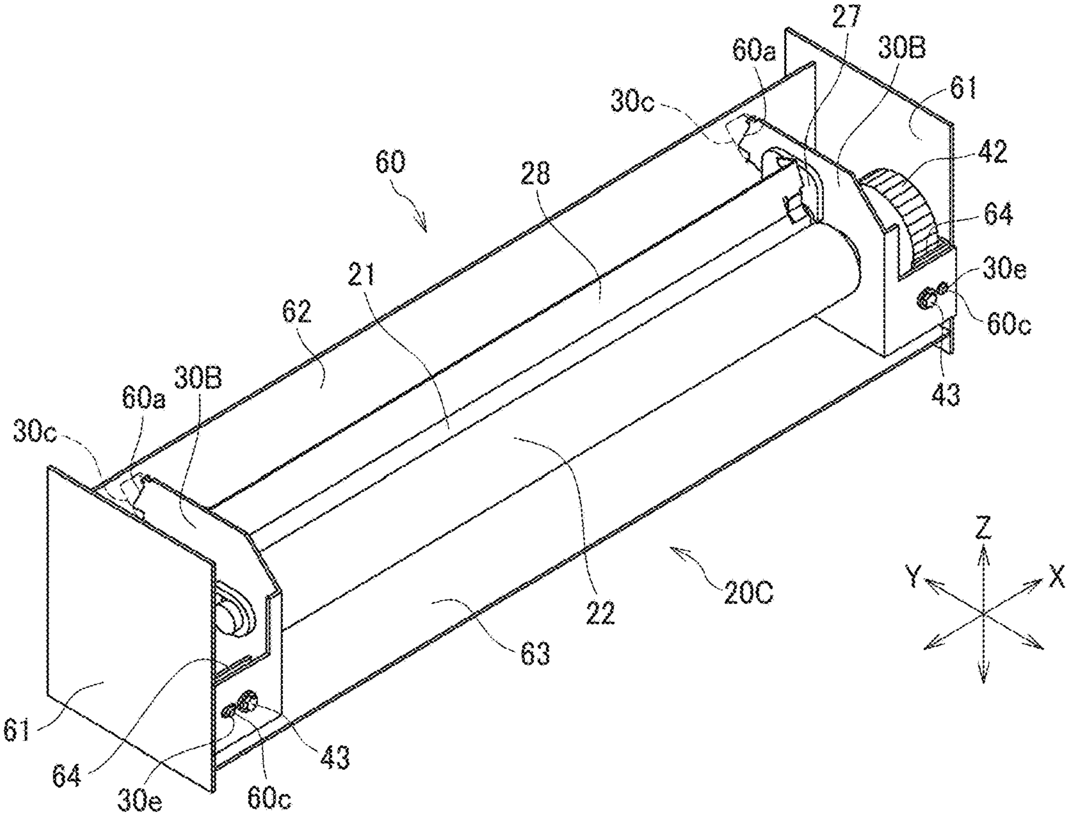
FIG. 13 is a perspective view of the fixing device depicted in FIG. 12 that is attached to the body frame depicted in FIG. 6.

FIG. 12 illustrates a fixing device 20C according to an embodiment of the present disclosure. Since the fixing device 20C has a predetermined rigidity and a predetermined mechanical strength, the fixing device 20C does not include the coupling frames 31 that are disposed in the attachment portion side S1 and the coupling frame side S2 depicted in FIG. 11B, respectively. For example, the stay 25 or the like disposed within the loop formed by the fixing belt 21 serves as a coupling frame that couples a pair of support frames 30B, ensuring the predetermined rigidity and the predetermined mechanical strength of the fixing device 20C. Thus, the fixing device 20C eliminates the coupling frames 31 disposed in the attachment portion side S1 and the coupling frame side S2 that is opposite to the attachment portion side S1, respectively. Since the fixing device 20C eliminates the coupling frame 31 disposed in the coupling frame side S2, instead of the coupling frame 31, the fixing device 20C includes the support frames 30B. Each of the support frames 30B includes an attachment portion 30*f* that is disposed at one end of the support frame 30B, that is opposite to another end of the support frame 30B in the first orthogonal direction Y, that is provided with the attachment portion 30*c*. The attachment portion 30*f* includes a positioning hole 30*e* and a screw through hole 30*d*. Accordingly, as illustrated in FIG. 13, in a state in which the fixing device 20C is attached to the body frame 60, the positioning projection 60*c* of the body frame 60 is inserted into the positioning hole 30*e* of each of the support frames 30B. The screw 43 is inserted into the screw through hole 30*d* depicted in FIG. 12 of each of the support frames 30B. Thus, the fixing device 20C is secured to the body frame 60.

As described above, even if the fixing device 20C eliminates the coupling frames 31 that are disposed in the attachment portion side S1 and the coupling frame side S2 that is opposite to the attachment portion side S1, the support frames 30B are attached to the body frame 60 both in the attachment portion side S1 and the coupling frame side S2. Accordingly, the fixing device 20C retains the predetermined distance between the support frames 30B, ensuring the rigidity and the mechanical strength of the fixing device 20C.

As illustrated in FIG. 12, the attachment portions 30*c* and 30*f* are disposed at at least one of one end or another end of each of the support frames 30B in the first orthogonal direction Y The fixing device 20C eliminates the coupling frames 31 disposed at at least one of one end or another end of each of the support frames 30B in the first orthogonal direction Y Alternatively, the attachment portions 30*c* and 30*f* may be disposed at at least one of one end or another end of each of the support frames 30B in the second orthogonal direction Z. The fixing device 20C may eliminate the coupling frames 31 disposed at at least one of one end or another end of each of the support frames 30B in the second orthogonal direction Z. For example, according to the embodiment, the attachment portions 30*c* and 30*f* may be disposed at at least one of one end or another end of each of the support frames 30B in the first orthogonal direction Y The fixing device 20C may eliminate the coupling frames 31 disposed at at least one of one end or another end of each of the support frames 30B in the first orthogonal direction Y The first orthogonal direction Y is perpendicular to the longitudinal direction X of a pair of rotators (e.g., the fixing belt 21 and the pressure roller 22). The one end and the another end of each of the support frames 30B are disposed outboard from the pair of rotators in the first orthogonal direction Y or the second orthogonal direction Z.

The above describes the embodiments of the present disclosure. The embodiments of the present disclosure are also applied to fixing devices, other than the fixing devices 20, 20A, 20B, and 20C having the constructions described above, respectively. The following describes constructions of fixing devices 20D, 20E, 20F, and 20G applied with the embodiments of the present disclosure.

Figure 14:
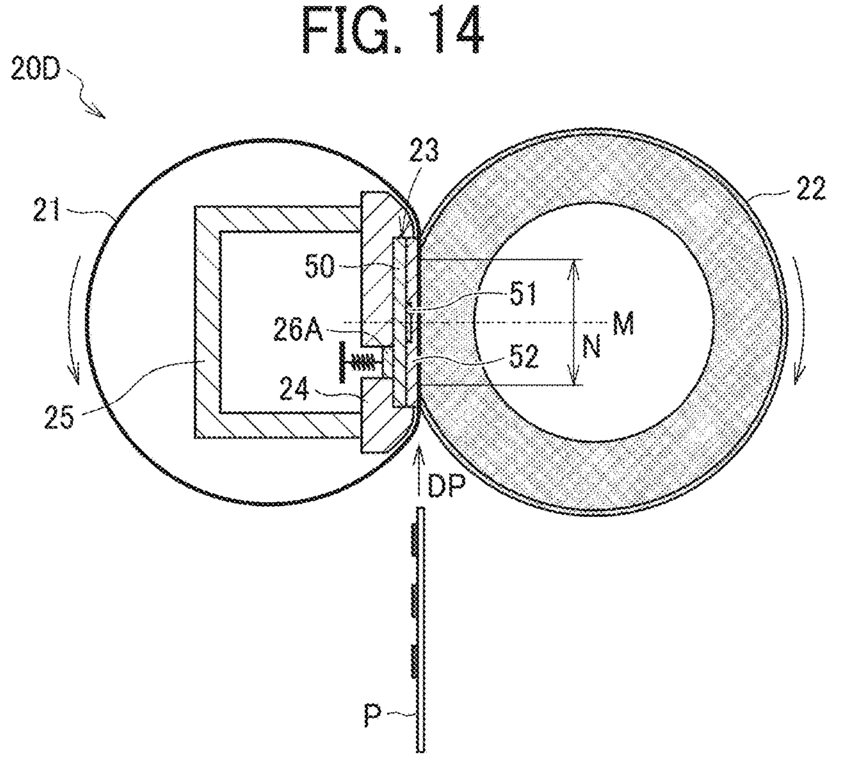
FIG. 14 is a cross-sectional view of a fixing device according to yet another embodiment of the present disclosure, that is installable in the image forming apparatus depicted in FIG. 1.

FIG. 14 illustrates the construction of the fixing device 20D including a temperature sensor 26A that detects the temperature of the heater 23. The temperature sensor 26A is disposed at a position different from a position of the temperature sensor 26 of the fixing device 20 depicted in FIG. 2. Other construction of the fixing device 20D is equivalent to the construction of the fixing device 20. FIG. 14 omits illustration of the separator 28 and the support frame 30 depicted in FIG. 2. In the fixing device 20D depicted in FIG. 14, the temperature sensor 26A is disposed upstream from a center M of the fixing nip N in the sheet conveyance direction DP and disposed in proximity to an entry to the fixing nip N. Conversely, in the fixing device 20 depicted in FIG. 2, the temperature sensor 26 is disposed opposite the center M of the fixing nip N in the sheet conveyance direction DP. As illustrated in FIG. 14, since the temperature sensor 26A is disposed upstream from the center M of the fixing nip N in the sheet conveyance direction DP, the temperature sensor 26A detects the temperature of the heater 23 precisely at a position in proximity to the entry to the fixing nip N. In a region on the fixing belt 21, that is disposed in proximity to the entry to the fixing nip N, a sheet P entering the fixing nip N draws heat from the fixing belt 21 easily. Hence, the temperature sensor 26A detects the temperature of the heater 23 precisely at the position in proximity to the entry to the fixing nip N, thus achieving a fixing property of causing the heater 23 to heat the fixing belt 21 to fix a toner image on the sheet P and effectively suppressing a fixing offset of heating the toner image insufficiently.

Figure 15:
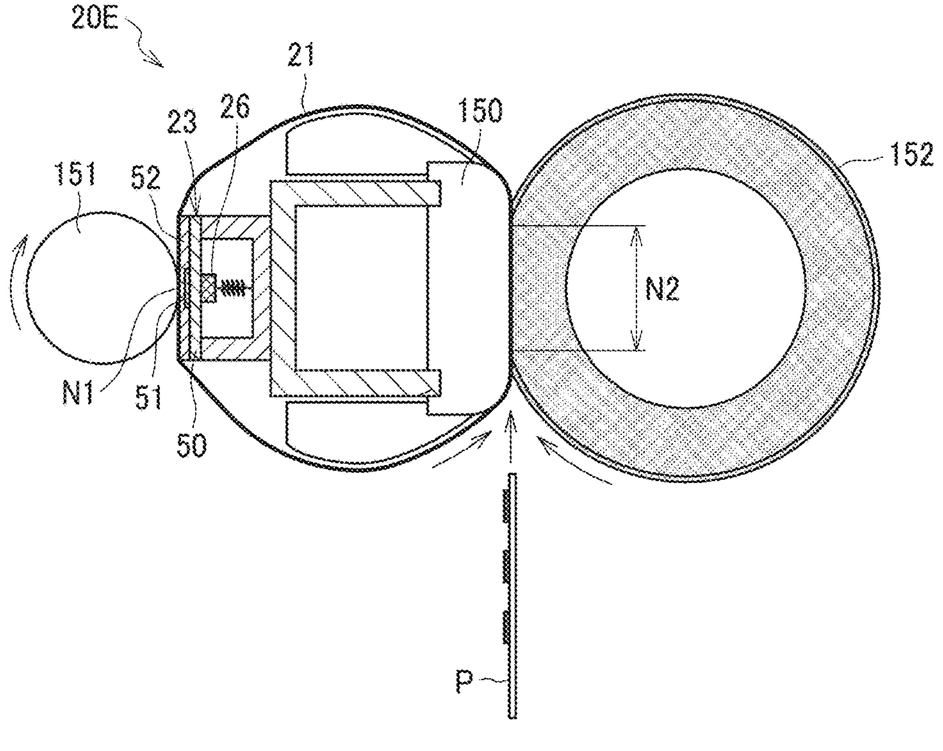
FIG. 15 is a cross-sectional view of a fixing device according to yet another embodiment of the present disclosure, that is installable in the image forming apparatus depicted in FIG. 1.

FIG. 15 illustrates the construction of the fixing device 20E including a heating nip N1 and a fixing nip N2 disposed separately from the heating nip N1. The heater 23 heats the fixing belt 21 that passes through the heating nip N1. A sheet P is conveyed through the fixing nip N2. For example, the fixing device 20E includes a nip formation pad 150 that is disposed within the loop formed by the fixing belt 21 in addition to the heater 23. The fixing device 20E further includes pressure rollers 151 and 152. The pressure rollers 151 and 152 disposed outside the loop formed by the fixing belt 21 are pressed against the heater 23 and the nip formation pad 150, respectively, via the fixing belt 21. Thus, the heater 23 and the pressure roller 151 form the heating nip N1 between the fixing belt 21 and the pressure roller 151. The nip formation pad 150 and the pressure roller 152 form the fixing nip N2 between the fixing belt 21 serving as a first rotator or a fixing rotator and the pressure roller 152 serving as a second rotator or a pressure rotator. The heater 23 heats the fixing belt 21 at the heating nip N1. The fixing belt 21 conducts heat to the sheet P at the fixing nip N2, thus fixing an unfixed toner image on the sheet P.

Figure 16:
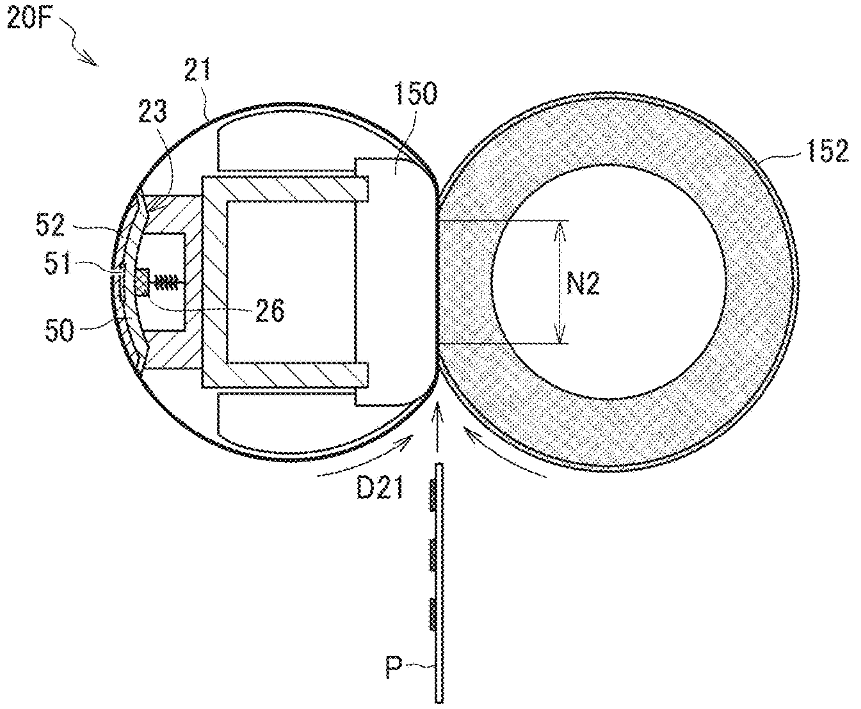
FIG. 16 is a cross-sectional view of a fixing device according to yet another embodiment of the present disclosure, that is installable in the image forming apparatus depicted in FIG. 1.

FIG. 16 illustrates the construction of the fixing device 20F that does not incorporate the pressure roller 151 that is disposed opposite the heater 23 as illustrated in FIG. 15. The heater 23 is curved into an arc in cross section that corresponds to a curvature of the fixing belt 21. Other construction of the fixing device 20F is equivalent to the construction of the fixing device 20E depicted in FIG. 15. Since the heater 23 is curved into the arc in cross section, the heater 23 contacts the fixing belt 21 for a sufficient contact length in the rotation direction D21 of the fixing belt 21, heating the fixing belt 21 efficiently.

Figure 17:
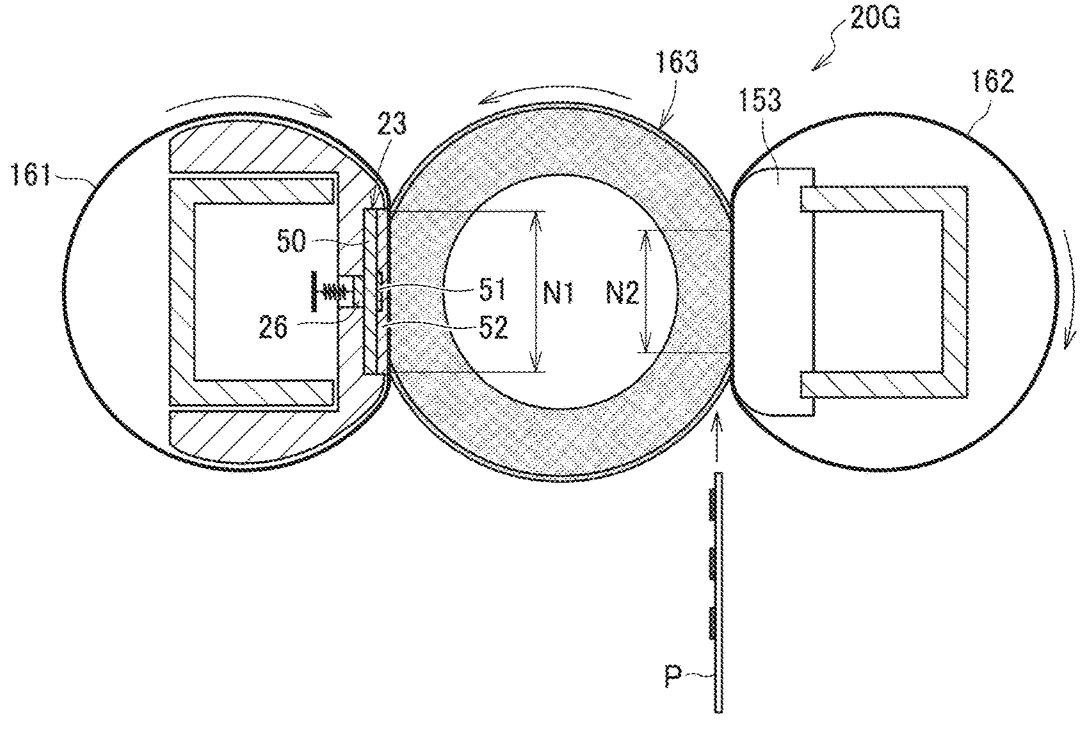
FIG. 17 is a cross-sectional view of a fixing device according to yet another embodiment of the present disclosure, that is installable in the image forming apparatus depicted in FIG. 1.

FIG. 17 illustrates the construction of the fixing device 20G that includes a pair of belts 161 and 162 and a roller 163 that is interposed between the belts 161 and 162. The belt 162 serves as a first rotator or a fixing rotator. The roller 163 serves as a second rotator or a pressure rotator. The heater 23 is disposed within a loop formed by the belt 161 on the left of the roller 163 in FIG. 17. The fixing device 20G further includes a nip formation pad 153 that is disposed within a loop formed by the belt 162 on the right of the roller 163 in FIG. 17. The heater 23 presses against the roller 163 via the belt 161 on the left of the roller 163 in FIG. 17, thus forming the heating nip N1 between the belt 161 and the roller 163. The nip formation pad 153 presses against the roller 163 via the belt 162 on the right of the roller 163 in FIG. 17, thus forming the fixing nip N2 between the belt 162 and the roller 163.

An image forming apparatus applied with the embodiments of the present disclosure is not limited to the image forming apparatus 100 depicted in FIG. 1 that forms a color toner image. For example, the embodiments of the present disclosure are also applied to an image forming apparatus 100A having a construction described below with reference to FIG. 18. The following describes the construction of the image forming apparatus 100A to which the embodiments of the present disclosure are applied.

Figure 18:
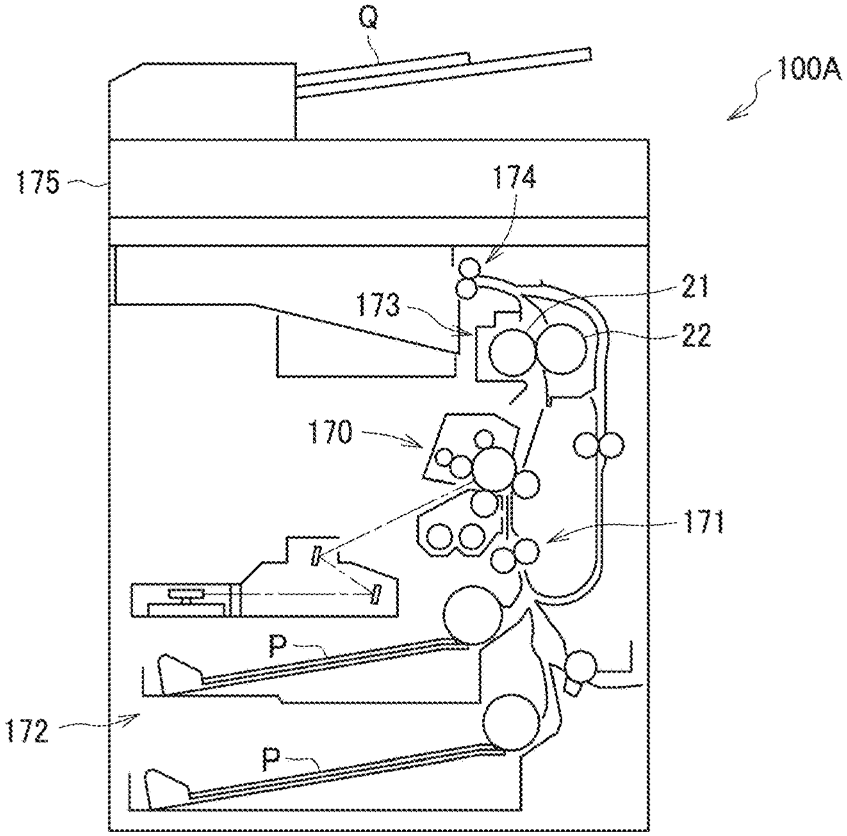
FIG. 18 is a cross-sectional view of an image forming apparatus according to another embodiment of the present disclosure, that is different from the image forming apparatus depicted in FIG. 1.

As illustrated in FIG. 18, the image forming apparatus 100A includes an image forming device 170 including a photoconductive drum, a sheet conveyance device including a timing roller pair 171, a sheet feeder 172, a fixing device 173, an output device 174, and a scanner 175. The sheet feeder 172 includes a plurality of sheet trays (e.g., paper trays) that loads a plurality of sheets P having different sizes, respectively.

The scanner 175 reads an image on an original Q into image data. The sheet feeder 172 loads the plurality of sheets P and feeds the sheets P to a sheet conveyance path one by one. The timing roller pair 171 conveys the sheet P conveyed through the sheet conveyance path to the image forming device 170.

The image forming device 170 forms a toner image on the sheet P. For example, the image forming device 170 includes the photoconductive drum, a charging roller, an exposure device, a developing device, a replenishing device, a transfer roller, a cleaner, and a discharger. The fixing device 173 includes the fixing belt 21 and the pressure roller 22 that fix the toner image on the sheet P under heat and pressure. The sheet P bearing the fixed toner image is conveyed to the output device 174 by a conveyance roller and the like. The output device 174 ejects the sheet P onto an outside of the image forming apparatus 100A.

Figure 19:
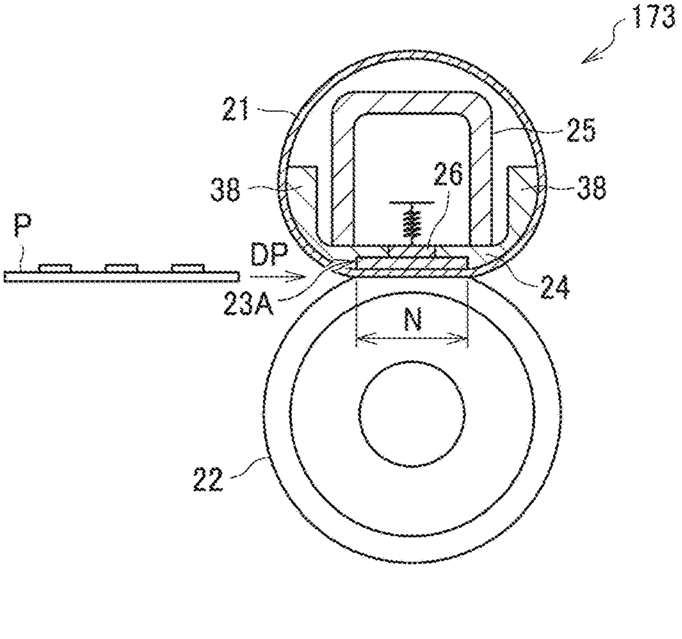
FIG. 19 is a cross-sectional view of a fixing device according to yet another embodiment of the present disclosure, that is incorporated in the image forming apparatus depicted in FIG. 18.

Referring to FIG. 19, a description is provided of a construction of the fixing device 173 according to an embodiment of the present disclosure.

The fixing device 173 depicted in FIG. 19 includes elements that are shared with the fixing device 20 depicted in FIG. 2 and assigned with reference numerals depicted in FIG. 2. A description of the shared elements is omitted.

As illustrated in FIG. 19, the fixing device 173 includes the fixing belt 21, the pressure roller 22, a heater 23A, the heater holder 24, the stay 25, and the temperature sensor 26.

The fixing nip N is formed between the fixing belt 21 and the pressure roller 22. The fixing nip N has a nip length of 10 mm in the sheet conveyance direction DP. The fixing belt 21 and the pressure roller 22 convey the sheet P at a linear velocity of 240 mm/s.

The fixing belt 21 includes the base layer made of polyimide and the release layer and does not include the elastic layer. The release layer is heat-resistant film made of fluororesin, for example. The fixing belt 21 has an outer diameter of approximately 24 mm.

The pressure roller 22 includes the core metal, the elastic layer, and the release layer. The pressure roller 22 has an outer diameter in a range of from 24 mm to 30 mm. The elastic layer of the pressure roller 22 has a thickness in a range of from 3 mm to 4 mm.

Figure 20:
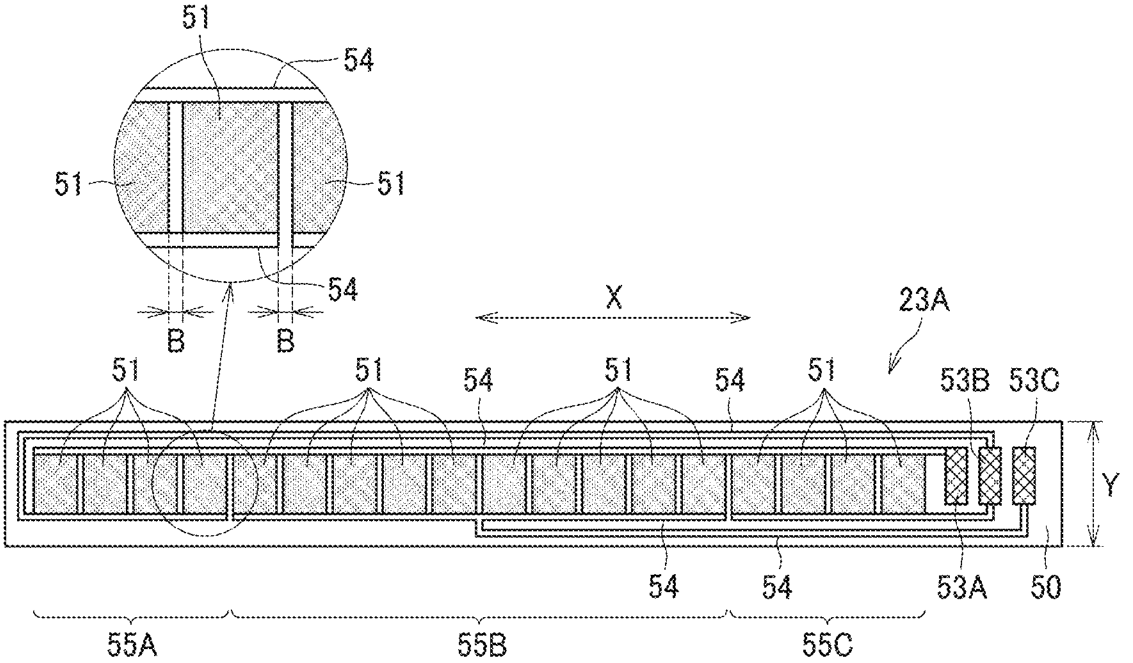
FIG. 20 is a plan view of a heater incorporated in the fixing device depicted in FIG. 19.

As illustrated in FIG. 20, the heater 23A includes the base 50, a thermal insulation layer, a conductor layer including the resistive heat generators 51, and an insulating layer. The heater 23A has a total thickness of 1 mm. The heater 23A has a length of 13 mm in the sheet conveyance direction DP.

As illustrated in FIG. 19, the fixing device 173 further includes a plurality of guides 38 that is mounted on the heater holder 24 and guides the fixing belt 21. Each of the guides 38 has a guide face that is formed in an arc or a projecting curved face in cross section that is curved along the inner circumferential face of the fixing belt 21. While the fixing belt 21 rotates, the fixing belt 21 slides over the guide face of each of the guides 38 such that the guides 38 guide the fixing belt 21. The guides 38 are combined with the heater holder 24. Alternatively, the guides 38 may be separated from the heater holder 24.

As illustrated in FIG. 20, the conductor layer of the heater 23A includes the plurality of resistive heat generators 51, the feeders 54, and electrodes 53A, 53B, and 53C. The plurality of resistive heat generators 51 is arranged in the longitudinal direction X of the heater 23A with a gap B between the adjacent resistive heat generators 51. The gap B between the adjacent resistive heat generators 51 defines a dividing region. As illustrated in an enlarged view in FIG. 20, the resistive heat generators 51 create a plurality of gaps B each of which is provided between the adjacent resistive heat generators 51. FIG. 20 illustrates two gaps B in the enlarged view. However, the gap B is disposed at each gap between the adjacent resistive heat generators 51 depicted in FIG. 20. FIG. 20 illustrates the first orthogonal direction Y that intersects or is perpendicular to the longitudinal direction X of the heater 23A. The first orthogonal direction Y is different from a thickness direction of the base 50. The first orthogonal direction Y is perpendicular to an arrangement direction of the plurality of resistive heat generators 51. The first orthogonal direction Y is parallel to a mounting face of the base 50, which mounts the resistive heat generators 51. The first orthogonal direction Y is a short direction of the heater 23A. The first orthogonal direction Y is parallel to the sheet conveyance direction DP in which the sheet P is conveyed through the fixing device 173.

The plurality of resistive heat generators 51 constructs a center heat generation portion 55B and lateral end heat generation portions 55A and 55C that generate heat separately from the center heat generation portion 55B. For example, the heater 23A includes the three electrodes 53A, 53B, and 53C. As power is supplied to the electrode 53A on the left of the electrode 53B and the electrode 53B disposed at a center of the three electrodes 53A, 53B, and 53C in FIG. 20, the lateral end heat generation portions 55A and 55C generate heat. As power is supplied to the electrodes 53A and 53C that sandwich the electrode 53B, the center heat generation portion 55B generates heat. For example, in order to fix a toner image on a sheet P having a decreased size not greater than a predetermined size, the center heat generation portion 55B generates heat. In order to fix a toner image on a sheet P having an increased size greater than the predetermined size, the lateral end heat generation portions 55A and 55C and the center heat generation portion 55B generate heat collectively, heating the fixing belt 21 according to a size of a sheet P.

Figure 21:
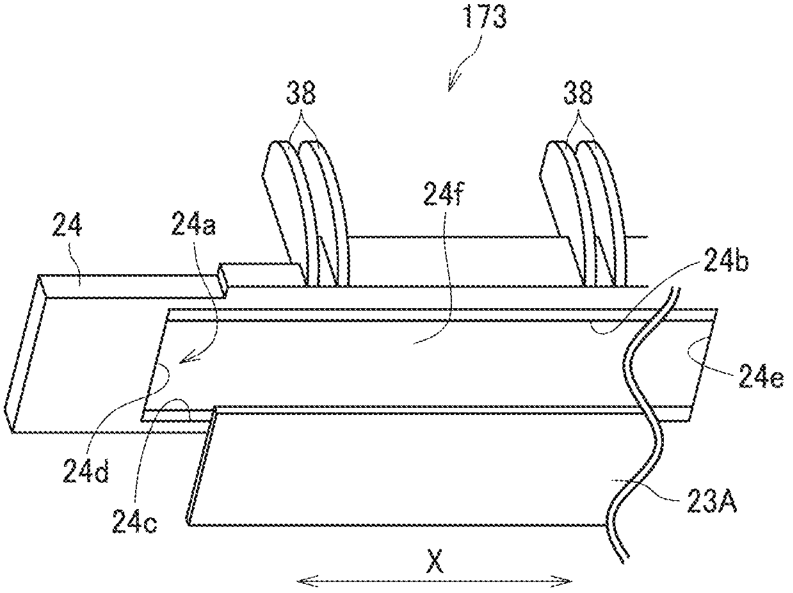
FIG. 21 is a perspective view of the heater depicted in FIG. 20 and a heater holder incorporated in the fixing device depicted in FIG. 19.

As illustrated in FIG. 21, the heater holder 24 according to the embodiment includes a recess 24*a* that accommodates and holds the heater 23A. The recess 24*a* is disposed on a heater opposed face of the heater holder 24, which is disposed opposite the heater 23A. The recess 24*a* is constructed of a bottom 24*f* (e.g., a bottom face) and four walls 24*b*, 24*c*, 24*d*, and 24*e* (e.g., side faces). The bottom 24*f* is a rectangle that is equivalent to the heater 23A in size. The four walls 24*b*, 24*c*, 24*d*, and 24*e* extend along four sides, respectively, that define a contour of the bottom 24*f* and are perpendicular to the bottom 24*f*. The pair of walls 24*d* and 24*e* (e.g., a left wall and a right wall in FIG. 21) extends in a direction perpendicular to the longitudinal direction X of the heater 23A, that is, the arrangement direction in which the resistive heat generators 51 are arranged. One of the walls 24*d* and 24*e* may be omitted so that the recess 24*a* is open at a position disposed opposite one lateral end of the heater 23A in the longitudinal direction X thereof.

Figure 22:
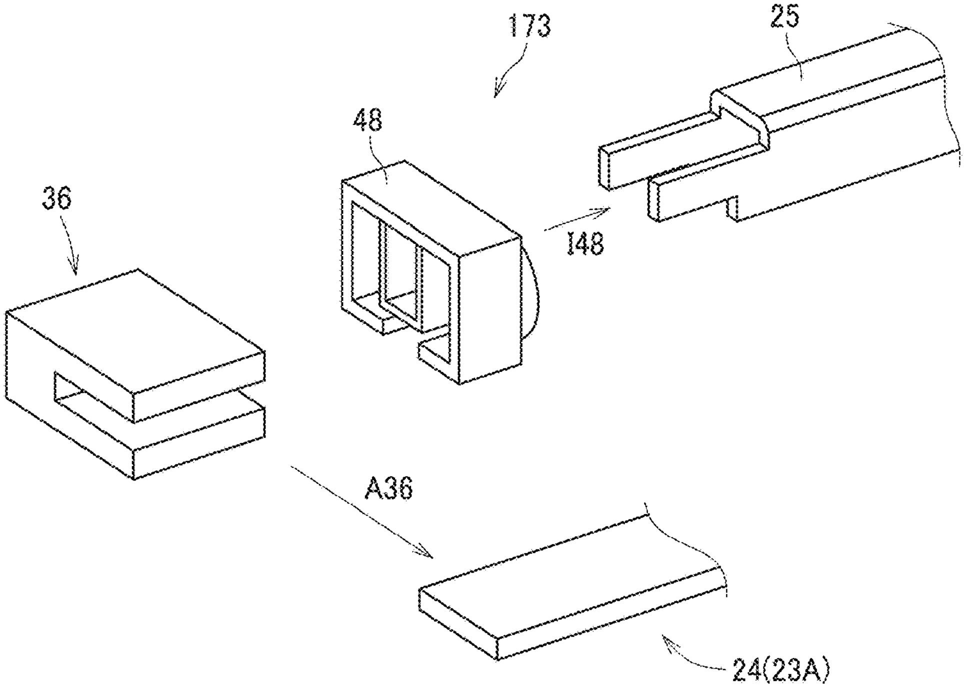
FIG. 22 is a perspective view of the heater incorporated in the fixing device depicted in FIG. 19 and a connector to be attached to the heater.

As illustrated in FIG. 22, the fixing device 173 further includes a connector 36 that holds or supports the heater 23A and the heater holder 24 according to the embodiment. The connector 36 includes a housing made of resin such as LCP and a plurality of contact terminals disposed in the housing.

The connector 36 is attached to the heater 23A and the heater holder 24 in an attachment direction A36 perpendicular to the longitudinal direction X of the heater 23A, that is, the arrangement direction in which the resistive heat generators 51 are arranged. The connector 36 is attached to one lateral end of the heater 23A and the heater holder 24 in the longitudinal direction X of the heater 23A. The one lateral end of the heater 23A and the heater holder 24 is opposite to another lateral end of the heater 23A and the heater holder 24 in the longitudinal direction X of the heater 23A (e.g., the arrangement direction of the resistive heat generators 51), with which the driver (e.g., a motor) that drives the pressure roller 22 is coupled. Alternatively, in order to attach the connector 36 to the heater holder 24, one of the connector 36 and the heater holder 24 may include a projection that engages a recess disposed in another one of the connector 36 and the heater holder 24 such that the projection moves inside the recess relatively.

In a state in which the connector 36 is attached to the heater 23A and the heater holder 24, the connector 36 sandwiches and holds the heater 23A and the heater holder 24 such that the connector 36 is disposed opposite a front face and a back face of the heater 23A and the heater holder 24. In a state in which the connector 36 sandwiches and holds the heater 23A and the heater holder 24, as the contact terminals of the connector 36 contact and press against the electrodes 53A, 53B, and 53C of the heater 23A depicted in FIG. 20, the resistive heat generators 51 are electrically connected to a power supply disposed in the image forming apparatus 100A through the connector 36. Thus, the power supply is ready to supply power to the resistive heat generators 51.

The fixing device 173 further includes a flange 48 depicted in FIG. 22. The flange 48 is disposed at each lateral end of the fixing belt 21 in the longitudinal direction X thereof. The flange 48 serves as a belt holder that contacts the inner circumferential face of the fixing belt 21 and holds or supports the fixing belt 21 at each lateral end of the fixing belt 21 in the longitudinal direction X thereof. The flange 48 is inserted into each lateral end of the stay 25 in an insertion direction 148 and is secured to each of a pair of side plates serving as a frame of the fixing device 173.

Figure 23:
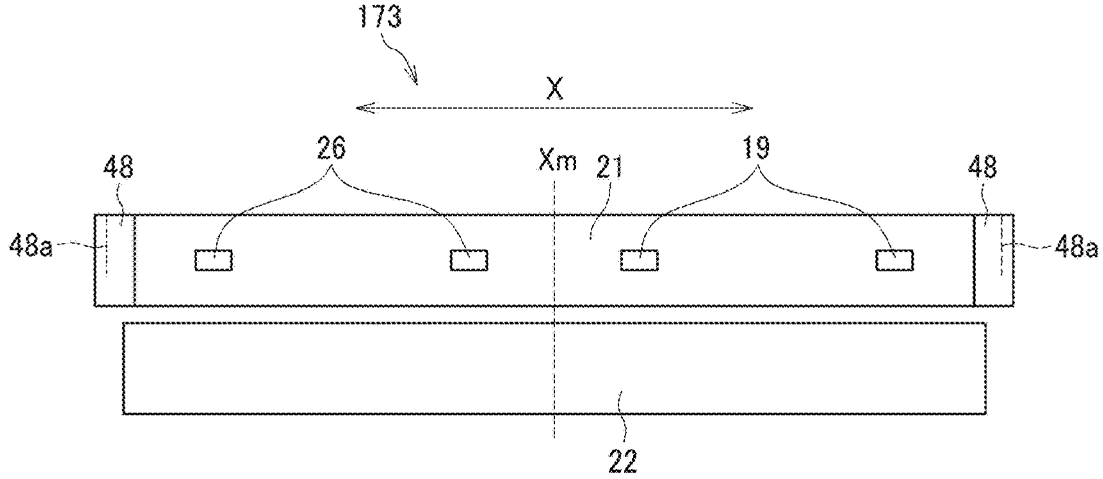
FIG. 23 is a diagram of temperature sensors, thermostats, and flanges incorporated in the fixing device depicted in FIG. 19, illustrating an arrangement of the temperature sensors and the thermostats.

As illustrated in FIG. 23, the fixing device 173 according to the embodiment further includes a plurality of thermostats 19 serving as a breaker. FIG. 23 is a diagram of the fixing device 173, illustrating an arrangement of the temperature sensors 26 and the thermostats 19.

As illustrated in FIG. 23, the temperature sensors 26 according to the embodiment are disposed opposite the inner circumferential face of the fixing belt 21 at a position in proximity to the center Xm and a position in one lateral end portion of the fixing belt 21 in the longitudinal direction X thereof, respectively. One of the temperature sensors 26 is disposed opposite the gap B depicted in FIG. 20 between the adjacent resistive heat generators 51 of the heater 23A.

The thermostats 19 serving as the breaker are disposed opposite the inner circumferential face of the fixing belt 21 at a position in proximity to the center Xm and a position in another lateral end portion of the fixing belt 21 in the longitudinal direction X thereof, respectively. Each of the thermostats 19 detects a temperature of the inner circumferential face of the fixing belt 21 or an ambient temperature at a position in proximity to the inner circumferential face of the fixing belt 21. If the temperature detected by the thermostat 19 is higher than a preset threshold, the thermostat 19 breaks power to the heater 23A.

Figure 24:
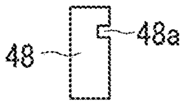
FIG. 24 is a diagram of the flange depicted in FIG. 23, illustrating a slide groove of the flange.

As illustrated in FIGS. 23 and 24, the flanges 48 that hold both lateral ends of the fixing belt 21 in the longitudinal direction X thereof include slide grooves 48*a*, respectively. The slide groove 48*a* extends in a contact-separation direction in which the fixing belt 21 comes into contact with and separates from the pressure roller 22. The slide grooves 48*a* engage engagements mounted on the frame of the fixing device 173, respectively. As the engagement moves relatively inside the slide groove 48*a*, the fixing belt 21 moves in the contact-separation direction with respect to the pressure roller 22.

The technology of the present disclosure is also applied to fixing devices 20H, 20I, 20J, 20K, 20L, 20M, 20N, and 20P illustrated in FIGS. 25 to 36 that have constructions described below, respectively.

Figure 25:
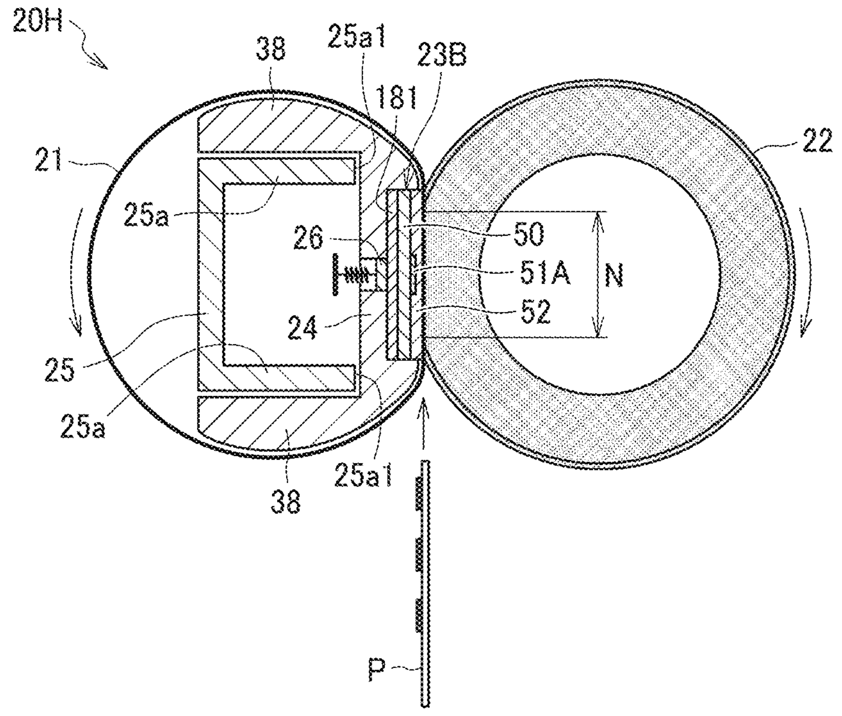
FIG. 25 is a cross-sectional view of a fixing device according to yet another embodiment of the present disclosure, that is installable in the image forming apparatus depicted in FIG. 18.

FIG. 25 is a schematic cross-sectional view of the fixing device 20H according to an embodiment of the present disclosure that is applied with the technology of the present disclosure.

As illustrated in FIG. 25, the fixing device 20H includes the fixing belt 21 serving as a first rotator or a fixing rotator, the pressure roller 22 serving as a second rotator or a pressure rotator, a heater 23B serving as a heat source, the heater holder 24 serving as a heat source holder, the stay 25 serving as a reinforcement, the temperature sensors 26 (e.g., the thermistors) serving as temperature detectors, and a first thermal conductor 181 serving as a thermal equalizer or a thermal conduction aid. The fixing belt 21 is an endless belt. The pressure roller 22 contacts the outer circumferential face of the fixing belt 21 to form the fixing nip N between the fixing belt 21 and the pressure roller 22. The heater 23B heats the fixing belt 21. The heater holder 24 holds or supports the heater 23B and the first thermal conductor 181. The stay 25 supports the heater holder 24. Each of the temperature sensors 26 detects a temperature of the first thermal conductor 181. The fixing belt 21, the pressure roller 22, the heater 23B, the heater holder 24, the stay 25, and the first thermal conductor 181 extend in a longitudinal direction that is perpendicular to a paper surface in FIG. 25 and is parallel to the width direction of a sheet P conveyed through the fixing nip N, the longitudinal direction of the fixing belt 21, and the axial direction of the pressure roller 22.

Like the heater 23A depicted in FIG. 20, the heater 23B depicted in FIG. 25 includes a plurality of resistive heat generators 51A arranged in the longitudinal direction of the heater 23B with the gap B between the adjacent resistive heat generators 51A. However, with the plurality of resistive heat generators 51A arranged with the gap B between the adjacent resistive heat generators 51A, the heater 23B has a gap region disposed opposite the gap B between the adjacent resistive heat generators 51A and a heat generator region disposed opposite the resistive heat generator 51A. The gap region is subject to a decreased temperature that is lower than an increased temperature of the heat generator region. Accordingly, the fixing belt 21 may also suffer from temperature decrease in a gap region thereon disposed opposite the gap region of the heater 23B, resulting in uneven temperature of the fixing belt 21 in the longitudinal direction thereof.

Accordingly, also with the heater 23B depicted in FIG. 25, the fixing device 20H incorporates the first thermal conductor 181 that suppresses temperature decrease in the gap region of the fixing belt 21 and therefore suppresses uneven temperature of the fixing belt 21 in the longitudinal direction thereof.

A description is provided of a configuration of the first thermal conductor 181 in detail.

As illustrated in FIG. 25, the first thermal conductor 181 is interposed between the heater 23B and the stay 25 in a horizontal direction in FIG. 25. Specifically, the first thermal conductor 181 is sandwiched between the heater 23B and the heater holder 24. For example, the first thermal conductor 181 has one face that contacts a back face of the base 50 of the heater 23B. The first thermal conductor 181 has another face (e.g., an opposite face opposite to the one face) that contacts the heater holder 24.

The stay 25 includes two perpendicular portions 25*a* that extend in a thickness direction of the heater 23B and the like. Each of the perpendicular portions 25*a* has a contact face 25*al* that contacts the heater holder 24, supporting the heater holder 24, the first thermal conductor 181, and the heater 23B. The contact faces 25*al* are disposed outboard from the resistive heat generators 51A in an orthogonal direction (e.g., a vertical direction in FIG. 25) perpendicular to the longitudinal direction of the stay 25. Thus, the stay 25 suppresses conduction of heat thereto from the heater 23B, causing the heater 23B to heat the fixing belt 21 efficiently.

Figure 26:
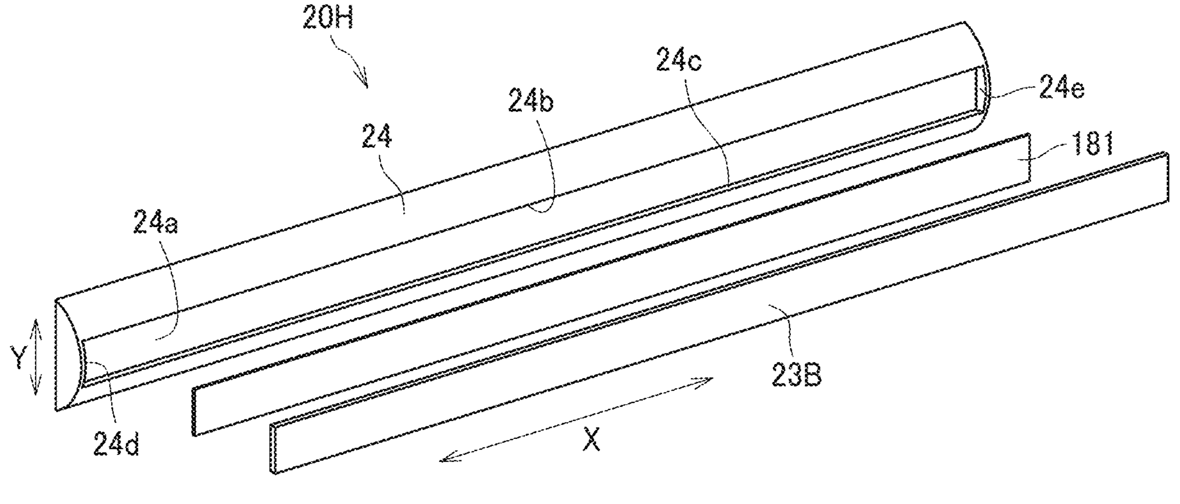
FIG. 26 is a perspective view of a heater, a first thermal conductor, and the heater holder incorporated in the fixing device depicted in FIG. 25.

As illustrated in FIG. 26, the first thermal conductor 181 is a plate having an even thickness. For example, the first thermal conductor 181 has a thickness of 0.3 mm, a length of 222 mm in the longitudinal direction X thereof, and a width of 10 mm in the first orthogonal direction Y perpendicular to the longitudinal direction X thereof. According to the embodiment, the first thermal conductor 181 is constructed of a single plate. Alternatively, the first thermal conductor 181 may be constructed of a plurality of members. FIG. 26 omits illustration of the guides 38 depicted in FIG. 25.

The first thermal conductor 181 is fitted to the recess 24*a* of the heater holder 24. The heater 23B is attached to the heater holder 24 from above the first thermal conductor 181. Thus, the heater holder 24 and the heater 23B sandwich and hold the first thermal conductor 181. According to the embodiment, the first thermal conductor 181 has a length in the longitudinal direction X thereof, which is equivalent to a length of the heater 23B in the longitudinal direction X thereof. The recess 24*a* includes the walls 24*d* and 24*e* (e.g., side walls) that extend in the first orthogonal direction Y perpendicular to the longitudinal direction X of the recess 24*a*. The walls 24*d* and 24*e* serving as longitudinal direction restrictors, respectively, restrict motion of the first thermal conductor 181 and the heater 23B in the longitudinal direction X thereof. Thus, the walls 24*d* and 24*e* restrict shifting of the first thermal conductor 181 in the longitudinal direction X thereof inside the fixing device 20H, improving efficiency in conduction of heat in a target span in the longitudinal direction X of the first thermal conductor 181. The heater holder 24 further includes the walls 24*b* and 24*c* (e.g., side walls) that extend in the longitudinal direction X of the recess 24*a*. The walls 24*b* and 24*c*, serving as orthogonal direction restrictors, respectively, restrict motion of the first thermal conductor 181 and the heater 23B in the first orthogonal direction Y perpendicular to the longitudinal direction X of the first thermal conductor 181.

Figure 27:
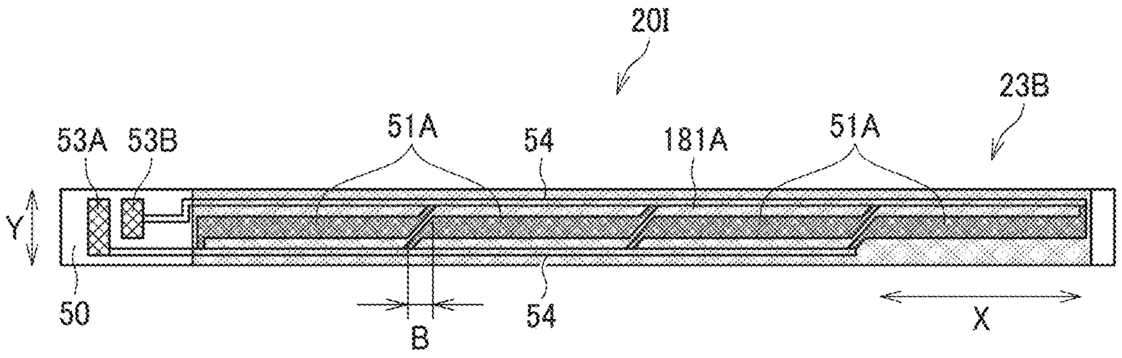
FIG. 27 is a plan view of the heater depicted in FIG. 26, illustrating an arrangement of a first thermal conductor as a variation of the first thermal conductor depicted in FIG. 26.

The first thermal conductor 181 may extend in a span other than a span in which the first thermal conductor 181 extends in the longitudinal direction X thereof as illustrated in FIG. 26. For example, as illustrated in FIG. 27, the fixing device 20I includes a first thermal conductor 181A that extends in a span hatched in FIG. 27 in which the resistive heat generators 51A are arranged in the longitudinal direction X of the heater 23B.

Figure 28:
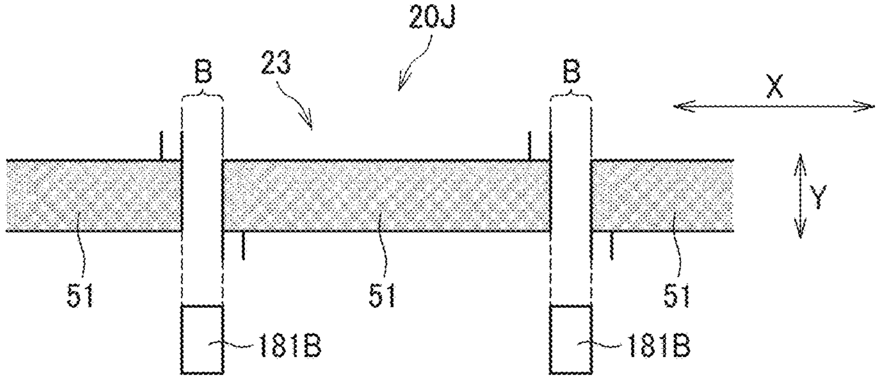
FIG. 28 is a plan view of the heater depicted in FIG. 4, illustrating an arrangement of a first thermal conductor as another variation of the first thermal conductor depicted in FIG. 26.

FIG. 28 illustrates the fixing device 20J including a plurality of first thermal conductors 181B. Apart of the plurality of first thermal conductors 181B is disposed opposite an entire span of the gap B (e.g., the dividing region) between the adjacent resistive heat generators 51 in the longitudinal direction X thereof. FIG. 28 illustrates the resistive heat generators 51 shifted from the first thermal conductors 181B vertically in FIG. 28 for convenience. Practically, the resistive heat generators 51 are substantially leveled with the first thermal conductors 181B in the first orthogonal direction Y perpendicular to the longitudinal direction X of the resistive heat generators 51. Alternatively, a first thermal conductor (e.g., the first thermal conductors 181, 181A, and 181B) may span a part of a resistive heat generator (e.g., the resistive heat generators 51 and 51A) in the first orthogonal direction Y perpendicular to the longitudinal direction X of the resistive heat generator.

Figure 29:
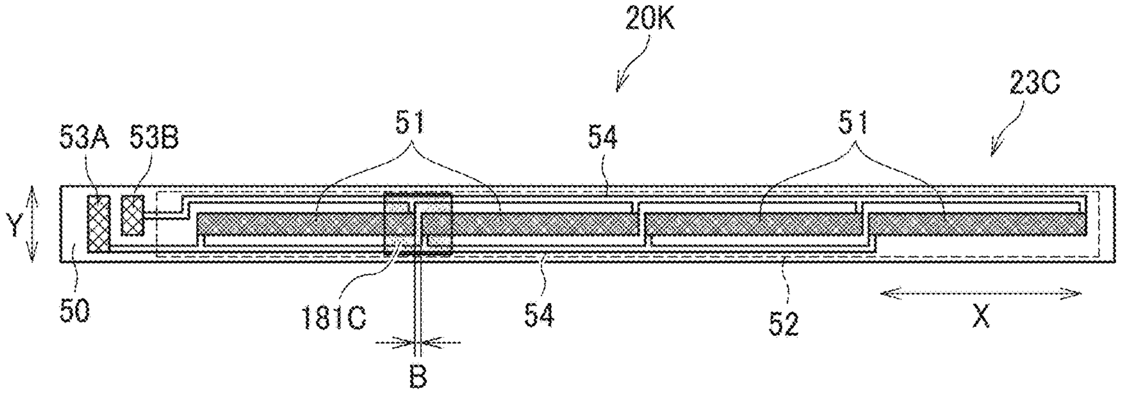
FIG. 29 is a plan view of a heater replaceable with the heater depicted in FIG. 26, illustrating an arrangement of a first thermal conductor as yet another variation of the first thermal conductor depicted in FIG. 26.

FIG. 29 illustrates the fixing device 20K including a heater 23C and a first thermal conductor 181C. The first thermal conductor 181C spans an entirety of the resistive heat generator 51 in the first orthogonal direction Y perpendicular to the longitudinal direction X of the resistive heat generator 51. As illustrated in FIG. 29, the first thermal conductor 181C is disposed opposite and spans the gap B in the longitudinal direction X of the heater 23C. Additionally, the first thermal conductor 181C bridges the adjacent resistive heat generators 51 that sandwich the gap B. A state in which the first thermal conductor 181C bridges the adjacent resistive heat generators 51 denotes a state in which the first thermal conductor 181C overlaps the adjacent resistive heat generators 51 at least partially in the longitudinal direction X of the heater 23C. Alternatively, a plurality of first thermal conductors 181C may be disposed opposite a plurality of gaps B of the heater 23C, respectively. As illustrated in FIG. 29, one or more first thermal conductors 181C are disposed opposite a part of the plurality of gaps B. According to an embodiment depicted in FIG. 29, the single first thermal conductor 181C is disposed opposite the single gap B. A state in which the first thermal conductor 181, 181A, 181B, or 181C is disposed opposite the gap B denotes a state in which at least a part of the first thermal conductor 181, 181A, 181B, or 181C overlaps the gap B in the longitudinal direction X of the resistive heat generator 51 or 51A.

As illustrated in FIG. 25, as the pressure roller 22 applies pressure to a heater (e.g., the heaters 23, 23A, 23B, and 23C), the heater and the heater holder 24 sandwich a first thermal conductor (e.g., the first thermal conductors 181, 181A, 181B, and 181C) such that the first thermal conductor contacts the heater and the heater holder 24. As the first thermal conductor contacts the heater, the first thermal conductor conducts heat generated by the heater in the longitudinal direction X thereof with improved efficiency. The first thermal conductor is disposed opposite the gaps B arranged in the longitudinal direction X of the heater. Thus, the first thermal conductor improves efficiency in conduction of heat at the gaps B, increases an amount of heat conducted to the gaps B, and increases the temperature of the heater at the gaps B. Accordingly, the first thermal conductor suppresses uneven temperature of the heater in the longitudinal direction X thereof, thereby suppressing uneven temperature of the fixing belt 21 in the longitudinal direction X thereof. Consequently, the fixing belt 21 suppresses uneven fixing and uneven gloss of a toner image fixed on a sheet P. The heater does not increase an amount of heat generation to attain sufficient fixing performance at the gaps B, causing a fixing device (e.g., the fixing devices 20H, 20I, 20J, and 20K) to save energy. For example, if the fixing device incorporates the first thermal conductor 181 or 181A that spans an entire region where the resistive heat generators 51A are arranged in the longitudinal direction X thereof, the first thermal conductor 181 or 181A improves efficiency in conduction of heat of the heater 23B in an entirety of a main heating span of the heater 23B disposed opposite an imaging span of a toner image formed on a sheet P conveyed through the fixing nip N. Accordingly, the first thermal conductor 181 or 181A suppresses uneven temperature of the heater 23B and the fixing belt 21 in the longitudinal direction X thereof.

The first thermal conductor (e.g., the first thermal conductors 181, 181A, 181B, and 181C) is coupled with the resistive heat generators (e.g., the resistive heat generators 51 and 51A) having a positive temperature coefficient (PTC), suppressing overheating of the fixing belt 21 in a non-conveyance span where a sheet P having the decreased size is not conveyed effectively. The PTC property defines a property in which the resistance value increases as the temperature increases, for example, a heater output decreases under a given voltage. For example, the resistive heat generator having the PTC property suppresses an amount of heat generation in the non-conveyance span effectively. Additionally, the first thermal conductor efficiently conducts heat from the non-conveyance span on the fixing belt 21 that suffers from temperature increase to a sheet conveyance span on the fixing belt 21 where the sheet P is conveyed. The PTC property and heat conduction of the resistive heat generator attain a synergistic effect that suppresses overheating of the fixing belt 21 in the non-conveyance span effectively.

Figure 30:
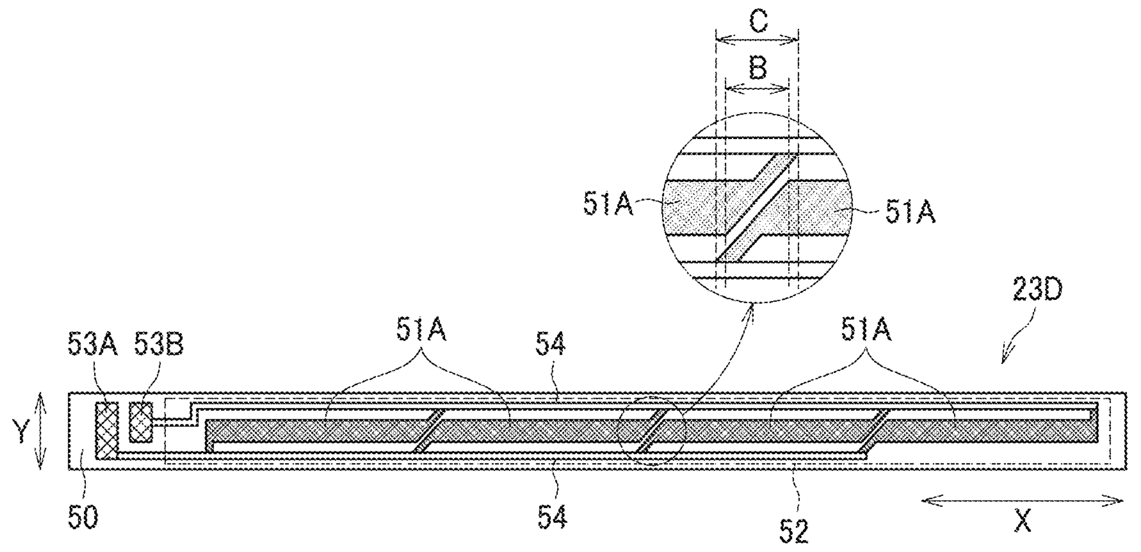
FIG. 30 is a plan view of a heater replaceable with the heater depicted in FIG. 26, illustrating an enlarged dividing region between resistive heat generators incorporated in the heater.

Since the heater (e.g., the heaters 23, 23B, and 23C) generates heat in a decreased amount at the gap B, the heater has a decreased temperature also in a periphery of the gap B. To address the circumstance, the first thermal conductor is preferably disposed also in the periphery of the gap B. For example, as illustrated in FIG. 30, the first thermal conductor (e.g., the first thermal conductors 181, 181A, and 181C) is disposed opposite an enlarged gap region C encompassing the periphery of the gap B. The first thermal conductor improves efficiency in conduction of heat at the gap B and the periphery of the gap B in the longitudinal direction X of a heater 23D, suppressing uneven temperature of the heater 23D in the longitudinal direction X thereof more effectively. The first thermal conductor 181 or 181A spans the entire region where the resistive heat generators 51A are arranged in the longitudinal direction X of the heater 23D, suppressing uneven temperature of the heater 23D and the fixing belt 21 in the longitudinal direction X thereof more precisely.

Figure 31:
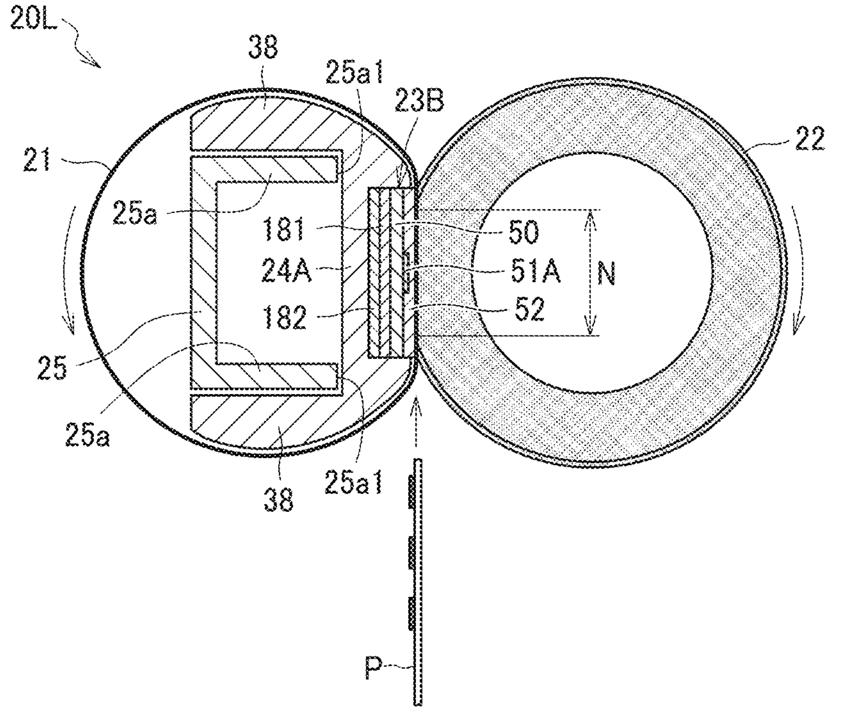
FIG. 31 is a cross-sectional view of a fixing device according to yet another embodiment of the present disclosure, that is installable in the image forming apparatus depicted in FIG. 18.

FIG. 31 is a schematic cross-sectional view of the fixing device 20L.

As illustrated in FIG. 31, the fixing device 20L includes a plurality of second thermal conductors 182 interposed between a heater holder 24A and the first thermal conductor 181. The second thermal conductors 182 are disposed at a position different from a position of the first thermal conductor 181 in a laminating direction (e.g., a horizontal direction in FIG. 31) in which the stay 25, the heater holder 24A, the second thermal conductors 182, the first thermal conductor 181, and the heater 23B are arranged. Specifically, the second thermal conductors 182 are superimposed on the first thermal conductor 181. Like the fixing device 20H depicted in FIG. 25, the fixing device 20L depicted in FIG. 31 incorporates the temperature sensors 26 (e.g., the thermistors) depicted in FIG. 25. FIG. 31 illustrates a cross section of the fixing device 20L in which the temperature sensors 26 are not disposed.

The second thermal conductors 182 are made of a material having a thermal conductivity greater than a thermal conductivity of the base 50. For example, the second thermal conductors 182 are made of graphene or graphite. According to the embodiment, each of the second thermal conductors 182 is a graphite sheet having a thickness of 1 mm. Alternatively, each of the second thermal conductors 182 may be a plate made of aluminum, copper, silver, or the like.

Figure 32:
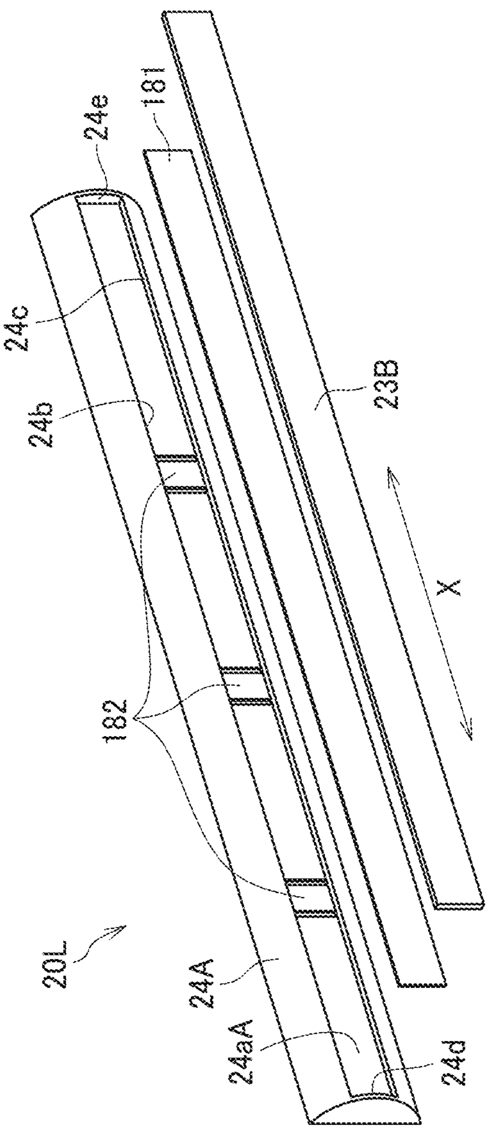
FIG. 32 is a perspective view of the heater, the first thermal conductor, second thermal conductors, and a heater holder incorporated in the fixing device depicted in FIG. 31.

As illustrated in FIG. 32, the plurality of second thermal conductors 182 is placed in a recess 24*a*A of the heater holder 24A. The adjacent second thermal conductors 182 sandwich a gap in the longitudinal direction X of the heater holder 24A. The heater holder 24A includes cavities placed with the second thermal conductors 182, respectively. The cavities are stepped down by one step from other portion of the heater holder 24A. The second thermal conductor 182 and the heater holder 24A define clearances therebetween at both lateral ends of the second thermal conductor 182 in the longitudinal direction X of the heater holder 24A. The clearances suppress conduction of heat from the second thermal conductor 182 to the heater holder 24A, causing the heater 23B to heat the fixing belt 21 efficiently. FIG. 32 omits illustration of the guides 38 depicted in FIG. 31.

Figure 33:
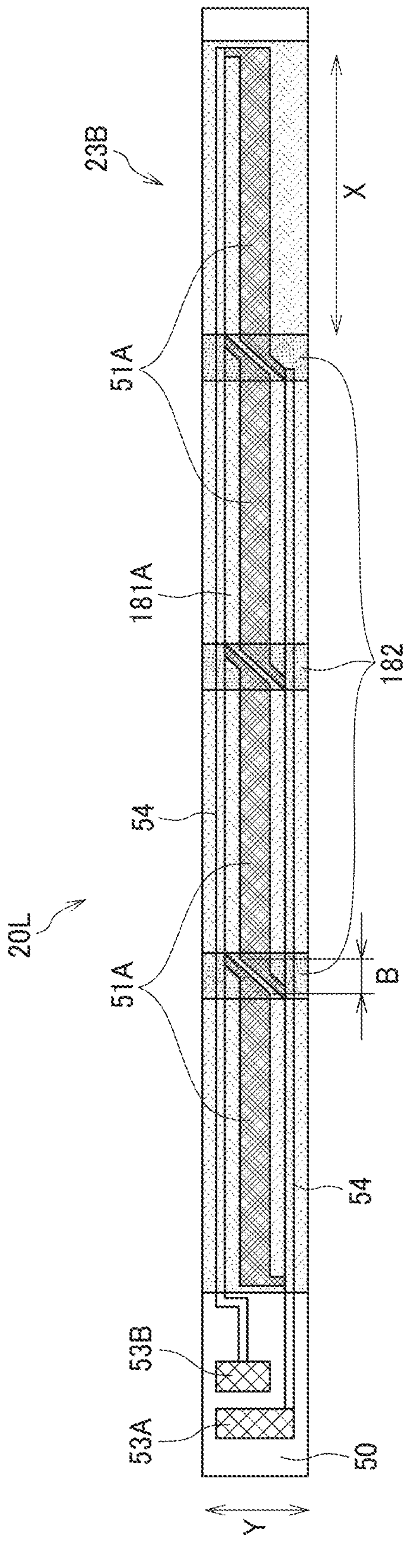
FIG. 33 is a plan view of the heater depicted in FIG. 32, illustrating an arrangement of the first thermal conductor depicted in FIG. 27 and the second thermal conductors depicted in FIG. 32.
Figure 35:
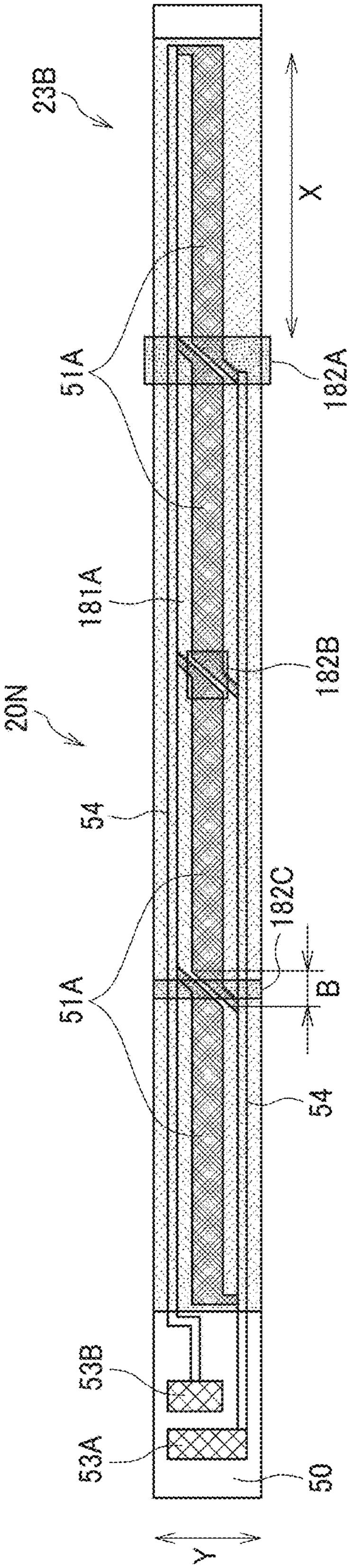
FIG. 35 is a plan view of the heater depicted in FIG. 33, illustrating an arrangement of second thermal conductors as a variation of the second thermal conductors depicted in FIG. 33.

As illustrated in FIG. 33, the second thermal conductor 182 that is hatched is disposed opposite the gap B between the adjacent resistive heat generators 51A and overlaps at least a part of the adjacent resistive heat generators 51A in the longitudinal direction X thereof. According to the embodiment, the second thermal conductor 182 spans an entirety of the gap B. FIG. 33 and FIG. 35 that is referred to in a description below illustrate the first thermal conductor 181A that spans the entire region where the resistive heat generators 51A are arranged in the longitudinal direction X thereof. Alternatively, the first thermal conductor 181A may span a region that is different from the region depicted in FIGS. 33 and 35.

As described above, in addition to the first thermal conductor 181, the second thermal conductor 182 is disposed opposite the gap B and overlaps at least a part of the adjacent resistive heat generators 51A in the longitudinal direction X thereof. The second thermal conductor 182 further improves efficiency in conduction of heat at the gap B in the longitudinal direction X of the heater 23B, suppressing uneven temperature of the heater 23B in the longitudinal direction X thereof more effectively.

Figure 34:
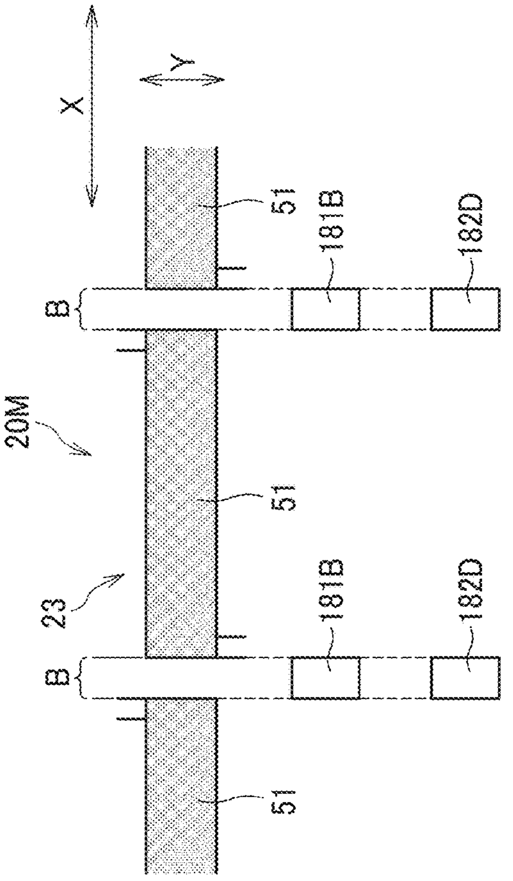
FIG. 34 is a plan view of the heater depicted in FIG. 28, illustrating the first thermal conductors and second thermal conductors that are arranged with an arrangement different from the arrangement depicted in FIG. 33.

FIG. 34 illustrates the fixing device 20M including the first thermal conductors 181B and a plurality of second thermal conductors 182D. A part of the first thermal conductors 181B and the second thermal conductors 182D is disposed opposite the entire span of the gap B in the longitudinal direction X of the resistive heat generator 51. Accordingly, the first thermal conductor 181B and the second thermal conductor 182D improve efficiency in conduction of heat at the gap B compared to other region defined by the resistive heat generators 51, which is other than the gap B. FIG. 34 illustrates the resistive heat generators 51 shifted from the first thermal conductors 181B and the second thermal conductors 182D vertically in FIG. 34 for convenience. Practically, the resistive heat generators 51 are substantially leveled with the first thermal conductors 181B and the second thermal conductors 182D in the first orthogonal direction Y perpendicular to the longitudinal direction X of the resistive heat generators 51. Alternatively, the first thermal conductors 181B and the second thermal conductors 182D may be disposed with respect to the resistive heat generators 51 with other arrangement. For example, the first thermal conductor 181B and the second thermal conductor 182D may span or cover a part or the entirety of the resistive heat generator 51 in the first orthogonal direction Y perpendicular to the longitudinal direction X of the resistive heat generator 51.

Each of the first thermal conductors 181, 181A, 181B, and 181C and the second thermal conductors 182 and 182D may be the graphene sheet. In this case, each of the first thermal conductors 181, 181A, 181B, and 181C and the second thermal conductors 182 and 182D has an enhanced thermal conductivity in a predetermined direction along a surface of the graphene sheet, that is, the longitudinal direction X, not a thickness direction of the graphene sheet. Accordingly, each of the first thermal conductors 181, 181A, 181B, and 181C and the second thermal conductors 182 and 182D suppresses uneven temperature of the heater 23, 23A, 23B, 23C, or 23D and the fixing belt 21 in the longitudinal direction X thereof effectively.

As illustrated in FIG. 33, the second thermal conductor 182 is disposed opposite the gap B between the adjacent resistive heat generators 51A and the enlarged gap region C depicted in FIG. 30 and overlaps at least a part of the adjacent resistive heat generators 51A in the longitudinal direction X of the heater 23B. Hence, the second thermal conductor 182 may be positioned with respect to the resistive heat generators 51A differently from the second thermal conductor 182 depicted in FIG. 33.

For example, FIG. 35 illustrates the fixing device 20N including second thermal conductors 182A, 182B, and 182C as a variation of the second thermal conductors 182 depicted in FIG. 33. The second thermal conductor 182A protrudes beyond the base 50 bidirectionally in the first orthogonal direction Y perpendicular to the longitudinal direction X of the heater 23B. The second thermal conductor 182B is disposed opposite a span of the resistive heat generator 51A in the first orthogonal direction Y of the heater 23B. The second thermal conductor 182C spans a part of the gap B.

Figure 36:
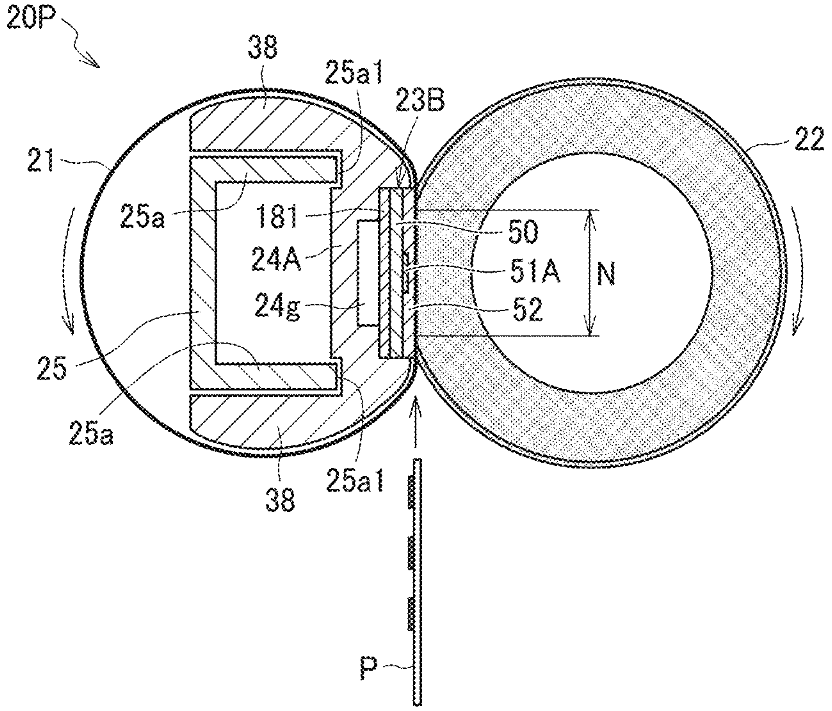
FIG. 36 is a cross-sectional view of a fixing device according to yet another embodiment of the present disclosure, that is installable in the image forming apparatus depicted in FIG. 18.

FIG. 36 illustrates the fixing device 20P in which the heater holder 24A and the first thermal conductor 181 define a clearance therebetween in a thickness direction of the heater holder 24A (e.g., a horizontal direction in FIG. 36). For example, the heater holder 24A includes the recess **24*a*A depicted in FIG. 32 that accommodates the heater 23B, the first thermal conductor 181, and the second thermal conductors 182. The heater holder 24A includes a retracted portion 24*g* serving as a thermal insulation layer disposed at a part of the recess 24*a*A. The retracted portion 24*g* is disposed at a part of the recess 24*a*A, which is outboard from a portion of the recess 24*a*A, which is placed with the second thermal conductor 182, in the longitudinal direction X of the heater holder 24A. FIG. 36 omits illustration of the second thermal conductor 182. Apart of the recess 24*a*A of the heater holder 24A is deepened compared to other part of the recess 24*a*A to produce the retracted portion 24*g*. Accordingly, the heater holder 24A contacts the first thermal conductor 181 with a minimum contact area, suppressing conduction of heat from the first thermal conductor 181 to the heater holder 24A and causing the heater 23B to heat the fixing belt 21 efficiently. On a cross section that intersects a longitudinal direction of the fixing device 20P and is provided with the second thermal conductor 182, the second thermal conductor 182 contacts the heater holder 24A like the second thermal conductor 182 of the fixing device 20L according to the embodiment described above with reference to FIG. 31**.

The fixing device 20P according to the embodiment depicted in FIG. 36 includes the retracted portion **24*g* that spans an entirety of the resistive heat generator 51A in the first orthogonal direction Y thereof (e.g., a vertical direction in FIG. 36). Accordingly, the retracted portion 24*g* suppresses conduction of heat from the first thermal conductor 181 to the heater holder 24A effectively, improving efficiency in heating of the fixing belt 21 by the heater 23B. Alternatively, instead of the retracted portion 24*g* that defines the clearance, the fixing device 20P may incorporate a thermal insulator that has a thermal conductivity smaller than a thermal conductivity of the heater holder 24**A, as the thermal insulation layer.

According to the embodiment, the second thermal conductor 182 is provided separately from the first thermal conductor 181. Alternatively, the fixing device 20P may have other configuration. For example, the first thermal conductor 181 may include an opposed portion that is disposed opposite the gap B and has a thickness greater than a thickness of an outboard portion of the first thermal conductor 181, which is other than the opposed portion. Thus, the first thermal conductor 181 also achieves a function of the second thermal conductor 182.

Figure 37:
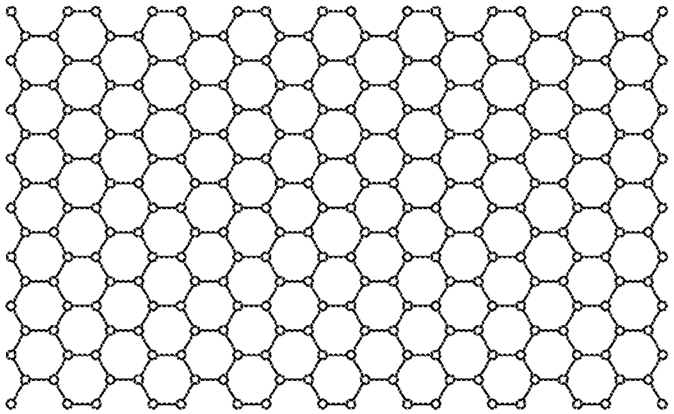
FIG. 37 is a diagram of a crystalline structure of atoms of graphene.
Figure 38:
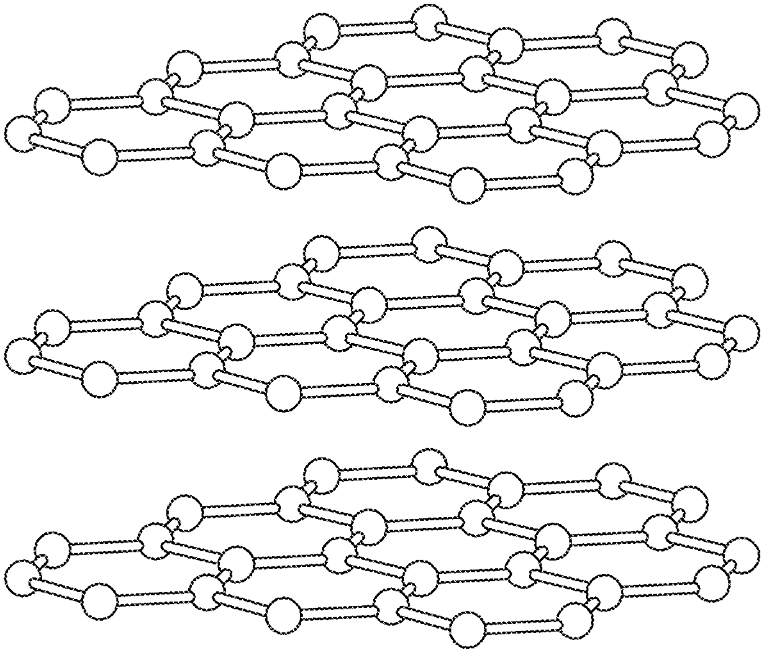
FIG. 38 is a diagram of a crystalline structure of atoms of graphite.

Referring to FIGS. 37 and 38, a description is provided of a configuration of each of the graphene sheet and the graphite sheet.

Graphene is thin powder. As illustrated in FIG. 37, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms or may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene $C_{60}$, $C_{70}$, and $C_{80}$, 3-coordinated carbon atoms, or the like.

The graphene sheet is artificial and is produced by chemical vapor deposition (CVD), for example.

The graphene sheet is commercially available. A size and a thickness of the graphene sheet and a number of layers and the like of the graphite sheet described below are measured with a transmission electron microscope (TEM), for example.

Graphite is constructed of stacked layers of graphene and is highly anisotropic in thermal conduction. As illustrated in FIG. 38, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 181, 181A, 181B, and 181C) or a second thermal conductor (e.g., the second thermal conductors 182, 182A, 182B, 182C, and 182D) is made of graphite. Accordingly, the first thermal conductor or the second thermal conductor attains an efficiency in conduction of heat in the longitudinal direction X of a heater (e.g., the heaters 23, 23A, 23B, 23C, and 23D), which is greater than an efficiency in conduction of heat in a thickness direction, that is, the laminating direction (e.g., the horizontal direction in FIG. 31) in which the stay 25, the heater holder 24A, the second thermal conductor 182, the first thermal conductor 181, and the heater 23B are arranged, thus suppressing conduction of heat to a heater holder (e.g., the heater holders 24 and 24A). Consequently, the first thermal conductor or the second thermal conductor suppresses uneven temperature of the heater in the longitudinal direction X thereof efficiently. Additionally, the first thermal conductor or the second thermal conductor minimizes heat conducted to the heater holder. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, a fixing device (e.g., the fixing devices 20H, 20I, 20J, 20K, 20L, 20M, 20N, and 20P) employs the graphite sheet having a decreased thickness to decrease thermal capacity of the fixing device. If the fixing nip N and a heater (e.g., the heaters 23, 23A, 23B, 23C, and 23D) have an increased length in the longitudinal direction X thereof, the first thermal conductor or the second thermal conductor also has an increased length in the longitudinal direction X of the heater.

In view of increasing mechanical strength, the graphite sheet preferably has a number of layers that is not smaller than 11 layers. The graphite sheet may include a part constructed of a single layer and another part constructed of a plurality of layers.

The above describes the constructions of the fixing devices 20A, 20B, 20C, 20D, 20E, 20F, 20G, 20H, 20I, 20J, 20K, 20L, 20M, 20N, 20P, and 173 and the image forming apparatus 100A to which the technology of the present disclosure applied to the fixing device 20 and the image forming apparatus 100 is also applied. The fixing devices 20A, 20B, 20C, 20D, 20E, 20F, 20G, 20H, 20I, 20J, 20K, 20L, 20M, 20N, 20P, and 173 and the image forming apparatus 100A that are applied with the technology of the present disclosure achieve advantages similar to the advantages achieved by the fixing device 20 and the image forming apparatus 100 according to the embodiments of the present disclosure. For example, each of the fixing devices 20, 20A, 20B, 20C, 20D, 20E, 20F, 20G, 20H, 20I, 20J, 20K, 20L, 20M, 20N, 20P, and 173 that is applied with the technology of the present disclosure decreases the size, the weight, and the manufacturing costs while ensuring the rigidity and the mechanical strength of an entirety of each of the fixing devices 20, 20A, 20B, 20C, 20D, 20E, 20F, 20G, 20H, 20I, 20J, 20K, 20L, 20M, 20N, 20P, and 173.

Application of the technology of the present disclosure is not limited to the fixing devices 20, 20A, 20B, 20C, 20D, 20E, 20F, 20G, 20H, 20I, 20J, 20K, 20L, 20M, 20N, 20P, and 173 installed in the image forming apparatus 100 or 100A that forms an image by electrophotography as described above. For example, the technology of the present disclosure is also applied to a heating device installed in an image forming apparatus employing an inkjet method. The heating device is a dryer, a laminator, a heat sealer, or the like. The dryer dries liquid such as ink applied onto a sheet. The laminator bonds a coating member such as film onto a surface of a sheet by thermocompression. The heat sealer bonds sealing portions of a packaging material by thermocompression.

With the embodiments of the present disclosure described above, the technology of the present disclosure encompasses at least a heating device, a fixing device, and an image forming apparatus that have configurations below.

A description is provided of a first configuration of the heating device (e.g., the fixing devices 20, 20A, 20B, 20C, 20D, 20E, 20F, 20G, 20H, 20I, 20J, 20K, 20L, 20M, 20N, 20P, and 173).

The heating device includes a pair of rotators, that is, a first rotator (e.g., the fixing belt 21 and the belt 162) and a second rotator (e.g., the pressure rollers 22 and 152 and the roller 163), a heater (e.g., the heaters 23, 23A, 23B, 23C, and 23D), a pair of support frames, that is, a first support frame (e.g., the support frame 30) and a second support frame (e.g., the support frame 30), and a coupling frame (e.g., the coupling frame 31).

The second rotator contacts the first rotator to form a nip (e.g., the fixing nips N and N2) between the first rotator and the second rotator. The heater heats at least one of the first rotator or the second rotator. The first support frame supports one lateral end of the first rotator and the second rotator in a longitudinal direction (e.g., the longitudinal direction X) thereof. The second support frame supports another lateral end of the first rotator and the second rotator in the longitudinal direction thereof. The coupling frame does not contact at least one of a first end (e.g., one end) and a second end (e.g., another end) of each of the first support frame and the second support frame in an orthogonal direction (e.g., the first orthogonal direction Y) that is perpendicular to the longitudinal direction of the first rotator and the second rotator. The first end and the second end of each of the first support frame and the second support frame are disposed outboard from the first rotator and the second rotator in the orthogonal direction. For example, the first end is disposed opposite the second end via the first rotator and the second rotator. The coupling frame couples the first support frame with the second support frame. Each of the first support frame and the second support frame includes an attachment portion (e.g., the attachment portion 30*c*) that is attached to a body frame (e.g., the body frame 60) of an image forming apparatus (e.g., the image forming apparatuses 100 and 100A).

A description is provided of a second configuration of the heating device.

With the first configuration of the heating device, the coupling frame that couples the first support frame with the second support frame contacts the first end of each of the first support frame and the second support frame, that is opposite to the second end.

A description is provided of a third configuration of the heating device.

With the first configuration or the second configuration of the heating device, the attachment portion is a projection (e.g., the attachment portion 30c) that is inserted into and attached to a hole (e.g., the hole 60a) of the body frame.

A description is provided of a fourth configuration of the heating device.

With the third configuration of the heating device, the projection has a width that decreases toward the hole in an insertion direction (e.g., the first orthogonal direction Y) in which the projection is inserted into the hole.

A description is provided of a fifth configuration of the heating device.

With any one of the first configuration to the fourth configuration of the heating device, each of the first support frame and the second support frame includes a plurality of attachment portions (e.g., the attachment portions 30c) that is arranged with a clearance therebetween in another orthogonal direction (e.g., the second orthogonal direction Z) that is perpendicular to the longitudinal direction of the first rotator and the second rotator and the orthogonal direction.

A description is provided of a sixth configuration of the heating device.

With the fifth configuration of the heating device, one of the plurality of attachment portions is positioned with respect to the body frame in the another orthogonal direction. Another one of the plurality of attachment portions is not positioned with respect to the body frame in the another orthogonal direction.

A description is provided of a seventh configuration of the heating device.

With any one of the first configuration to the sixth configuration of the heating device, the heater includes a plurality of heat generators (e.g., the resistive heat generators 51 and 51A) that is arranged in the longitudinal direction of the first rotator and the second rotator. For example, the heater includes a first heat generator (e.g., the resistive heat generators 51 and 51A) that generates heat and a second heat generator (e.g., the resistive heat generators 51 and 51A) that generates heat. The second heat generator is arranged with the first heat generator in the longitudinal direction of the first rotator and the second rotator.

A description is provided of an eighth configuration of the heating device.

With any one of the first configuration to the seventh configuration of the heating device, one of the pair of rotators, that is, the first rotator, includes an endless belt made of a material containing polyimide.

A description is provided of a ninth configuration of a fixing device (e.g., the fixing devices 20, 20A, 20B, 20C, 20D, 20E, 20F, 20G, 20H, 20I, 20J, 20K, 20L, 20M, 20N, 20P, and 173).

The fixing device includes the heating device having any one of the first configuration to the eighth configuration. The fixing device heats a recording medium (e.g., the sheet P) bearing an unfixed image, fixing the unfixed image on the recording medium.

A description is provided of a tenth configuration of an image forming apparatus (e.g., the image forming apparatuses 100 and 100A).

The image forming apparatus includes the heating device having any one of the first configuration to the eighth configuration or the fixing device having the ninth configuration.

Accordingly, the heating device decreases a size, a weight, and manufacturing costs thereof.

According to the embodiments described above, the fixing belt 21 serves as a first rotator. Alternatively, a fixing roller, a fixing film, a fixing sleeve, or the like may be used as a first rotator. Further, the pressure roller 22 serves as a second rotator. Alternatively, a pressure belt or the like may be used as a second rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A frame device comprising:

a body frame;

a first rotator to rotate in a first rotation direction and a second rotator to rotate in a second rotation direction such that a nip is formed between the first rotator and the second rotator;

a first support frame supporting one lateral end of the first rotator and one lateral end of the second rotator in a longitudinal direction of the first rotator and the second rotator, the first support frame including a first attachment portion being attached to the body frame;

a second support frame supporting another lateral end of the first rotator and another lateral end of the second rotator in the longitudinal direction of the first rotator and the second rotator, the second support frame including a second attachment portion being attached to the body frame; and a coupling frame coupling the first support frame with the second support frame, the coupling frame contacting one end of each of the first support frame and the second support frame in an orthogonal direction being perpendicular to the longitudinal direction of the first rotator and the second rotator, the one end being disposed opposite another end of each of the first support frame and the second support frame in the orthogonal direction via the first rotator and the second rotator, wherein an outer surface of the first rotator is exposed by the first support frame and the second support frame in a direction through a center of the first rotator and the nip, wherein an outer surface of the second rotator is exposed by the first support frame and the second support frame in a direction through a center of the second rotator and the nip, wherein the first support frame and the second support frame are attached to the body frame outside of the first rotator and the second rotator, and wherein the coupling frame is directly coupled to the body frame at an outer side of the first support frame and the second support frame.

2. The frame device according to claim 1, wherein the body frame has a first hole and a second hole, wherein the first attachment portion includes a first projection being inserted into and attached to the first hole of the body frame, and wherein the second attachment portion includes a second projection being inserted into and attached to the second hole of the body frame.

3. The frame device according to claim 2, wherein the first projection has a width that decreases toward the first hole in a first insertion direction in which the first projection is inserted into the first hole, and wherein the second projection has a width that decreases toward the second hole in a second insertion direction in which the second projection is inserted into the second hole.

4. The frame device according to claim 2, wherein each of the first hole and the second hole includes an edge, wherein the first attachment portion further includes a first step to contact the edge of the first hole, and wherein the second attachment portion further includes a second step to contact the edge of the second hole.

5. The frame device according to claim 1, wherein the first support frame further includes a third attachment portion being arranged with the first attachment portion with a first clearance between the first attachment portion and the third attachment portion in another orthogonal direction being perpendicular to the longitudinal direction of the first rotator and the second rotator and the orthogonal direction, and wherein the second support frame further includes a fourth attachment portion being arranged with the second attachment portion with a second clearance between the second attachment portion and the fourth attachment portion in said another orthogonal direction.

6. The frame device according to claim 5, wherein one of the first attachment portion and the third attachment portion is positioned with respect to the body frame in said another orthogonal direction, and wherein one of the second attachment portion and the fourth attachment portion is positioned with respect to the body frame in said another orthogonal direction.

7. The frame device according to claim 5, wherein the first support frame further includes a fifth attachment portion being disposed opposite the third attachment portion via the first rotator and the second rotator, the fifth attachment portion having a first positioning hole, wherein the second support frame further includes a sixth attachment portion being disposed opposite the fourth attachment portion via the first rotator and the second rotator, the sixth attachment portion having a second positioning hole, and wherein the body frame includes:

a first positioning projection being inserted into the first positioning hole; and a second positioning projection being inserted into the second positioning hole.

8. The frame device according to claim 1, further comprising:

a heater to heat the first rotator or the second rotator.

9. The frame device according to claim 8, wherein the heater includes:

a first heat generator to generate heat; and a second heat generator to generate heat, the second heat generator being arranged with the first heat generator in the longitudinal direction of the first rotator and the second rotator.

10. The frame device according to claim 8, wherein the first rotator or the second rotator includes an endless belt made of a material containing polyimide.

11. The frame device according to claim 8, wherein the first rotator includes a belt, wherein the second rotator includes a roller, and wherein the belt and the roller fix an unfixed image on a recording medium.

12. An image forming apparatus comprising:

an image forming portion;

a fixing portion;

a recording medium supply portion; and a recording medium ejecting portion, wherein the fixing portion includes the frame device according to claim 1; and a heater to heat the first rotator or the second rotator.

13. The frame device according to claim 1, wherein the first rotator is a fixing belt and the second rotator is a pressure roller.

* * * * *